United States Patent
Venkatachalam

(10) Patent No.: US 7,003,140 B2
(45) Date of Patent: Feb. 21, 2006

(54) SYSTEM AND METHOD OF SEARCHING FOR IMAGE DATA IN A STORAGE MEDIUM

(75) Inventor: Rajesh Venkatachalam, Fremont, CA (US)

(73) Assignee: IQ Biometrix, Fremont, CA (US)

( * ) Notice: Subject to any disclaimer, the term of this patent is extended or adjusted under 35 U.S.C. 154(b) by 95 days.

(21) Appl. No.: 10/705,934

(22) Filed: Nov. 13, 2003

(65) Prior Publication Data

US 2005/0108282 A1    May 19, 2005

(51) Int. Cl.
*G06K 9/00* (2006.01)
(52) U.S. Cl. .................. 382/118; 382/243; 351/204
(58) Field of Classification Search .............. 382/118, 382/115, 243; 351/204; 235/380; 340/5.1; 704/246; 902/3
See application file for complete search history.

(56) References Cited

U.S. PATENT DOCUMENTS

| | | | | |
|---|---|---|---|---|
| 5,787,186 A | * | 7/1998 | Schroeder | 381/115 |
| 5,852,669 A | * | 12/1998 | Eleftheriadis et al. | 382/118 |
| 5,926,575 A | * | 7/1999 | Ohzeki et al. | 382/243 |
| 6,044,168 A | * | 3/2000 | Tuceryan et al. | 382/118 |
| 6,801,641 B1 | * | 10/2004 | Eraslan | 382/118 |
| 6,807,290 B1 | * | 10/2004 | Liu et al. | 382/118 |
| 6,876,755 B1 | * | 4/2005 | Taylor et al. | 382/115 |

* cited by examiner

Primary Examiner—Daniel Miriam
Assistant Examiner—Barry Choobin
(74) Attorney, Agent, or Firm—Fleshner & Kim, LLP

(57) ABSTRACT

A system and method of searching for composite images in a database system is performed on a code word basis. To enable the search, the database stores facial codes which define a respective plurality of composite images. Each facial code includes element codes which define different facial features and which when combined cause a face having corresponding characteristics to be generated for display. To enable display of the composite images, digital image files corresponding to each facial feature is stored in memory along with a table which relates the files to corresponding element codes. When a facial code is retrieved from the database, the element codes in the facial code are linked to the digital files using the table and the resulting composite image is displayed. By storing facial codes in the database instead of the images themselves, the system and method advantageously reduce the amount of storage required for image searching compared with other systems which have been proposed.

35 Claims, 19 Drawing Sheets

| DIGITAL IMAGE FILES | ELEMENT CODE |
|---|---|
| EYE VARIATION 1 | E1111 |
| EYE VARIATION 2 | E1112 |
| ⋮ | ⋮ |
| EYE VARIATION N | E111N |
| NOSE VARIATION 1 | N1121 |
| NOSE VARIATION 2 | N1122 |
| ⋮ | ⋮ |
| NOSE VARIATION N | N112N |
| ⋮ | ⋮ |

FIG. 15

SYSTEM AND METHOD OF SEARCHING FOR IMAGE DATA IN A STORAGE MEDIUM

BACKGROUND OF THE INVENTION

1. Field of the Invention

This invention generally relates to information management systems, and more particularly to a system and method of searching for image data stored in a database or other information-bearing medium.

2. Description of the Related Art

Digital images may be formed in a variety of ways. The preferred way to obtain digital images of people, places, and objects is through the use of a digital camera. For materials which have already been captured on film, scanning is the preferred method of choice. This latter technique may also be used to capture various forms of art printed in books, magazines, and periodicals.

One form of art which has traditionally been relied on by law enforcement is the artist's sketch, developed based on eye-witness accounts of the facial features of a suspect. Recently, these sketches (commonly referred to as "mug shots") have been converted into digital image files for presentation on a computer. These files are usually in bit map, GIF, or JPEG format and therefore have large memory requirements. Attempts to use compression method to decrease these requirements have proven inadequate and result in degrading image quality.

Storing images in the aforementioned manner also makes them very difficult to search through. Similar to paging through a book of mugshot photographs, witnesses or law enforcement personnel trying to determine the identify of a suspect must still observe the images one at a time. This becomes increasingly difficult or impossible as the number of digital images stored in the system increases.

In view of the foregoing considerations, it is apparent that there is a need for a system and method for generating image data with vastly reduces memory requirements. There is also a need for a system and method which encodes images in a way that will enable them to be searched faster and more efficiently than other methods which have been proposed.

SUMMARY OF THE INVENTION

An object of the present invention is to provide a system and method of searching for image data in a storage medium which is different from any other system or method which has been proposed.

Another object of the present invention is to provide a system and method of searching for image data in a storage medium which is more efficient and returns more accurate results than any other system or method which has been proposed.

Another object of the present invention is to achieve one or more of the aforementioned objects by searching for image data on a code-word basis, where codes words generate composite images by integrating digital image files in a common display space.

Another object of the present invention is to store code words of the aforementioned type in a storage medium in lieu of the composite images themselves, thereby significantly reducing system storage requirements and/or increasing the rate at which search results are obtained.

Another object of the present invention is to implement one or more of the aforementioned systems and methods using a graphical user interface which provides a user with the convenience of controlling the formulation of a search statement based on code words and which also allows the user to view one or more composite images produced by the search statement.

Another object of the present invention is to provide a system and method of searching for image data in a storage medium which allows a user to assign confidence values to search results, so that the results may be sorted to provide a more meaningful output.

Another object of the present invention is to integrate one or more of the aforementioned systems and methods with facial recognition technology in order to further increase the speed and accuracy of a search for image data.

Another object of the present invention is to provide a system and method for encoding composite facial image data with significantly reduced memory requirements, and thus which enables this data to transmitted at faster speeds and with vastly reduced bandwidth requirements.

These and other objects and advantages are achieved by providing a method which includes as an initial step accessing a medium storing a plurality of facial codes, each of which includes element codes defining a respective plurality of features included in a digital representation of a face. In performing a search, a user designates at least one element code corresponding to a facial feature variation of interest and the medium is searched to locate at least one facial code that includes the designated element code. The step of designating an element code may be performed in a variety of ways.

In accordance with one embodiment, the designating step includes displaying a window having images each of which corresponds to a variation of a facial feature, receiving a user-initiated signal selecting one of the images, and identifying the selected image as corresponding to an element code. The searching step then produces a first set of facial codes which includes the element code. One or more composite images corresponding to the first set of facial codes are then displayed, a second element code is then designated, and a search of the first set of facial codes is performed to locate a second set of facial codes which includes the second element code. Additional iterations maybe performed as necessary until a final set of facial codes is obtained which either does or does not result in the generation of a relevant composite image. A user-initiated signal may select the relevant composite image for storage or output on a printer.

In accordance with another embodiment, the designating step includes receiving a user input signal including the element code. The signal may include alphanumeric characteristics generated using a keyboard or other input device. Once received, the searching step produces a first set of facial codes which includes the element code. Composite images corresponding to the first set of facial codes are then displayed, a user-initiated signal is received which includes a second element code, and the first set of facial codes are searched to locate a second set of facial codes which includes the second element code. These iterations may continue until a final set of search results is obtained which either does or does not contain a relevant composite image.

In accordance with another embodiment, the designating step includes receiving a user-initiated signal which includes a plurality of element codes related by one or more Boolean operators. The searching step is then performed to locate facial codes that include the elements codes related in a manner defined by the Boolean operators.

In accordance with another embodiment, the designating step includes acquiring an image of a subject, receiving information identifying a facial feature of the subject as depicted in the image, and associating the facial feature with an element code. The image may be acquired by a scanner, downloaded through a network, or received in various other ways. The image may be displayed to enable a user to identify the facial feature and then a search may be performed based on an element code corresponding to that feature.

In accordance with another embodiment, the designating step includes acquiring an image of a subject, using a facial recognition algorithm to identify one or more facial feature of the subject as depicted in the image, and determining element codes which correspond to the identified facial features. A search statement is then automatically formulated based on the element codes and a search is performed to locate facial codes that include the element codes.

Additional steps of the method include allowing a user to assign confidence values to one or more of the facial codes retrieved during one or more iterations of the search. The confidence values may then be used as a basis for sorting the search results to thereby provide a more relevant output to the user.

A system of searching for image data includes an interface connected to a first medium which stores facial codes defining composite images, a processor which receives a signal designating at least one element code and which searches the first medium to locate one or more facial codes that include the element code, and a screen which displays composite images corresponding to the facial codes located by the processor search. Using this system, either alone or with the assistance of one or more peripheral devices, the steps of the aforementioned embodiments of the method of the present invention may be performed.

BRIEF DESCRIPTION OF THE DRAWINGS

FIG. 15 is a diagram showing one way in which digital image files of facial feature variations may be associated with element codes in accordance with the present invention.

DESCRIPTION OF THE PREFERRED EMBODIMENTS

The present invention includes a system and method of searching for image data stored in a database or other type of information-bearing device or archival medium. The images may represent or otherwise include objects, places, events, or other subject matter capable of digital representation. In one particularly advantageous embodiment, the images represent faces of persons taken, for example, at any one of a number of predetermined angles. When implemented in this manner, the present invention has been indicated to be an extremely useful tool for advancing the purposes of law enforcement and national security. The present invention, however, is not intended to be limited to this application. On the contrary, those skilled in the art can appreciate that the system and method described herein maybe used as a search tool for locating missing persons or lost children, retrieving image data in media applications related to sports, news, and entertainment, or for other purposes.

Figure 1:
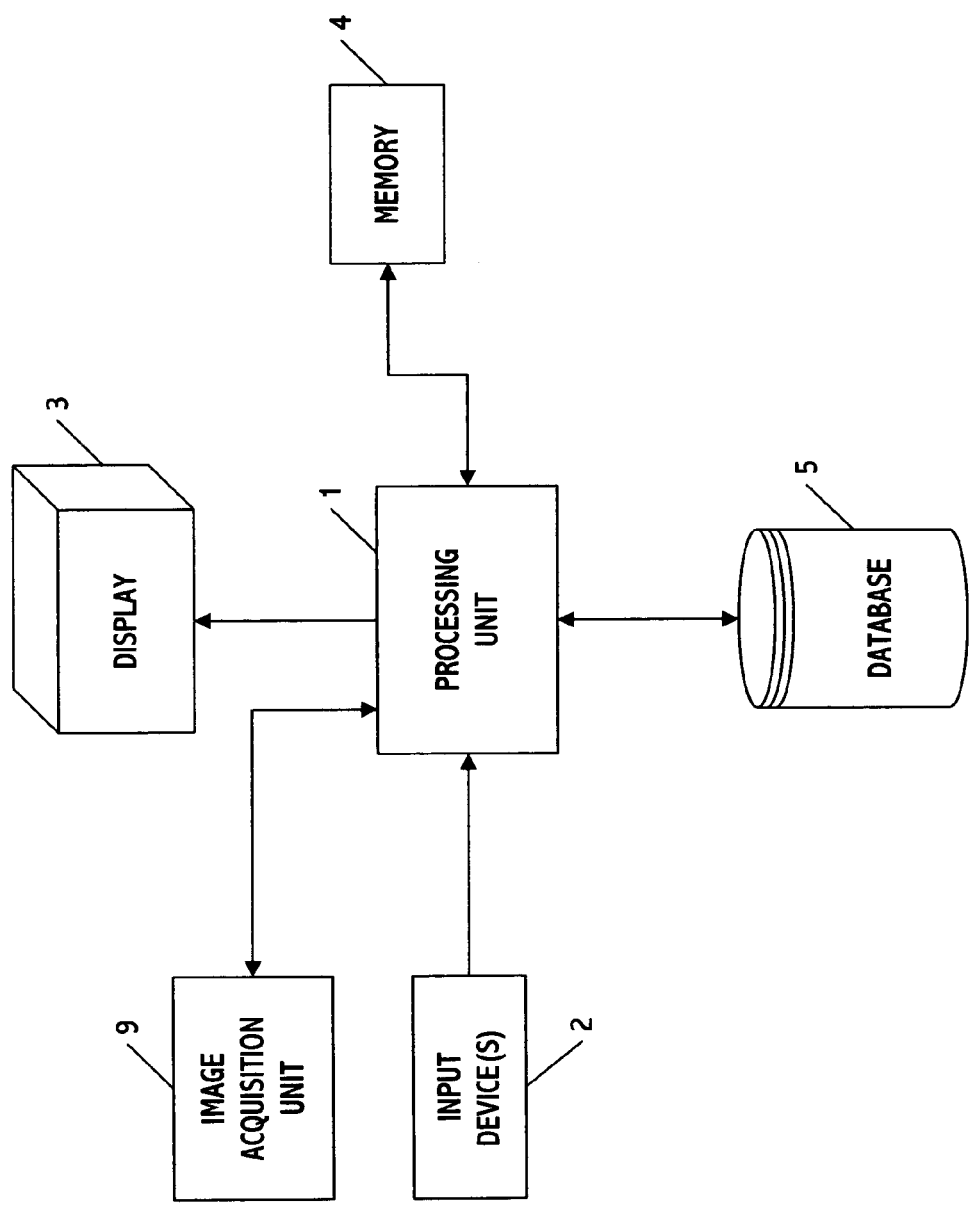
FIG. 1 is a diagram of a system for encoding, decoding, and/or searching image data in a storage medium in accordance with a first embodiment of the present invention

FIG. 1 shows a system for searching image data in accordance with a first embodiment of the present invention. The system includes a processing unit 1, a user input device 2, a display 3, and a memory unit 4. The processing unit maybe the central processing unit of a personal computer (e.g., desktop, laptop, notebook, tablet, pda, etc) or any other type of processor capable of performing an image search. To perform a search, the processing unit executes an application program which generates composite images based on information input by a user. This program is equipped with a function which enables a user to define a search statement for locating image data in an information-bearing medium.

The operation of this program, its interaction with a user, and the elements of the system which are controlled by the program will be discussed in greater detail below.

The memory unit may be used to store the application program along with other data, programs, drivers, communications software, and management/control information. The memory maybe resident within the system in the form of an internal or peripheral hard drive or maybe removable-type media such as a compact disk or flash memory. The user input device may be any type known including but not limited to a keyboard, mouse, touch pad, touch screen, or a combination of these or other devices. The display may also be any type capable of generating images.

A database 5 is also preferably included in this system. In a preferred implementation, the database stores codes which define a respective number of composite facial images. The preferred form of these facial codes and the information they contain are discussed in greater detail below. At this point, it is worthy to note that storing these facial codes in lieu of the composite images themselves is beneficial because it substantially reduces the amount of storage space required to implement the system. By way of example, consider a system which archives sketches of facial images as JPEG files. The storage space consumed by each file is vastly larger than the space required to store the facial codes of the present invention. By saving this space, the cost of implementing the present invention is substantially reduced and a more efficient search scheme is realized. The speed and accuracy of the image search is also improved.

In accordance with one embodiment of the invention, the foregoing advantages are uniquely achieved by performing keyword searches, where each keyword corresponds to a facial code or one or more element codes comprising the facial code. This allows different search algorithms to be implemented to obtain a desired result. Examples of search algorithms include Boolean searching and fuzzy searching, as well as others including ones that have been newly developed.

Figure 2:
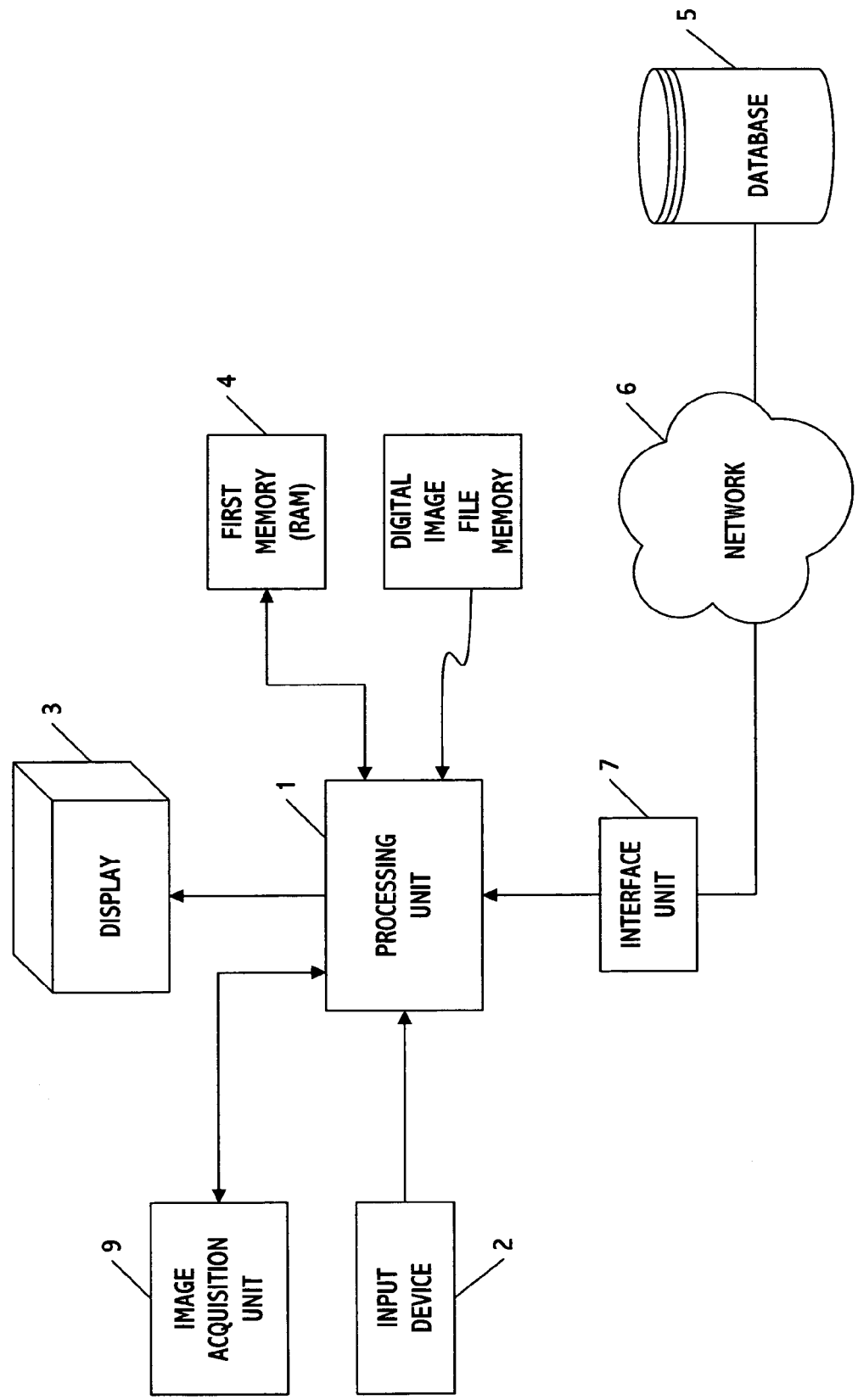
FIG. 2 is a diagram of a system for encoding, decoding, and/or searching image data in a storage medium in accordance with a second embodiment of the present invention

The database may be included within or nearby the system or may be connected to the processing unit through a network. FIG. 2 shows this latter configuration where the network is illustratively shown to be the Internet 6. An interface unit 7, for example, in the form of a modem may establish the communications link for connecting the processing unit to the database.

The network configuration is an especially advantageous embodiment of the invention because of its ability to be shared by many users in different geographical areas. The database may, for example, be centrally located and made accessible to law enforcement agencies throughout the country, thereby establishing a national system for assisting in the identification of criminals, missing persons, etc. The system may have even greater appeal as tool for locating terrorists who may have been spotted by citizens or on surveillance video taken in airports, bus terminals, malls, ATM machines, or other public places. As a terrorist-finding tool, the system of the present invention maybe applied internationally, thereby assisting in the development of a global task force formed from domestic and foreign law enforcement entities. While the foregoing applications are desirable to be sure, those skilled in the art can appreciate that the invention may be applied to perform other applications which perform or otherwise require image searching.

Instead of a database, the facial codes of the present invention may be stored in a fixed or removable computer-readable medium or archival device coupled to the processing unit. Storing the codes in the database, however, may prove to be preferable to these alternatives.

An optional image acquisition unit 9 may be included for scanning an image of a subject to be searched into memory. The scanned image may be displayed for purposes of allowing a user to identify one or more facial features which maybe searched using the system of the present invention. If desired, a facial recognition program may also be stored in memory to allow scanned images to automatically be defined in terms of facial codes or code portions. The codes or code portions may then be used as a basis for searching the database to find matching facial codes corresponding to one or more previously stored composite images. Searching maybe initiated by a user or automatically performed after code generation by the facial recognition program.

Figure 3:
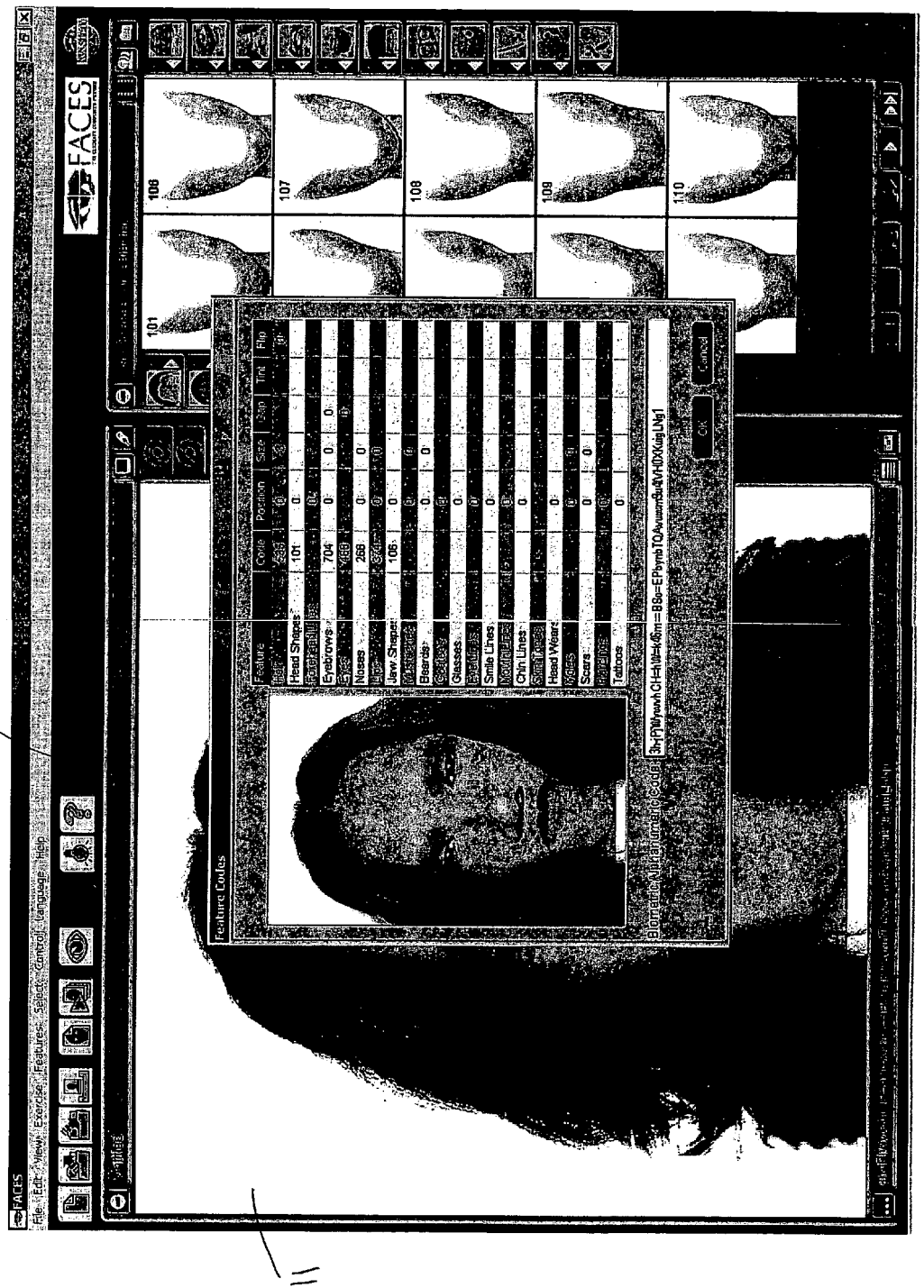
FIG. 3 is a diagram of an example of a graphical user interface which may be used to assist a user in searching for image data in a storage medium and for outputting composite images corresponding to image data located by the search.

FIG. 3 shows an example of a graphical user interface that may be used to assist a user in searching for image data of subject. The user interface is formed by the image-generating program and includes a management toolbar 10, a main window 11 for generating a composite facial image, and one or more additional windows which may be activated as a result of selections made on the toolbar. The toolbar in this example includes a number of file management and viewing options as well as features for allowing a user to formulate a search statement in accordance with any of the methods of the present invention. The toolbar also allows a user to control the manner in which composite images are generated in the main window, and to perform an enrollment process whereby facial codes of new images to be included in the database are defined and facial codes of existing images in the database are modified.

Figure 4:
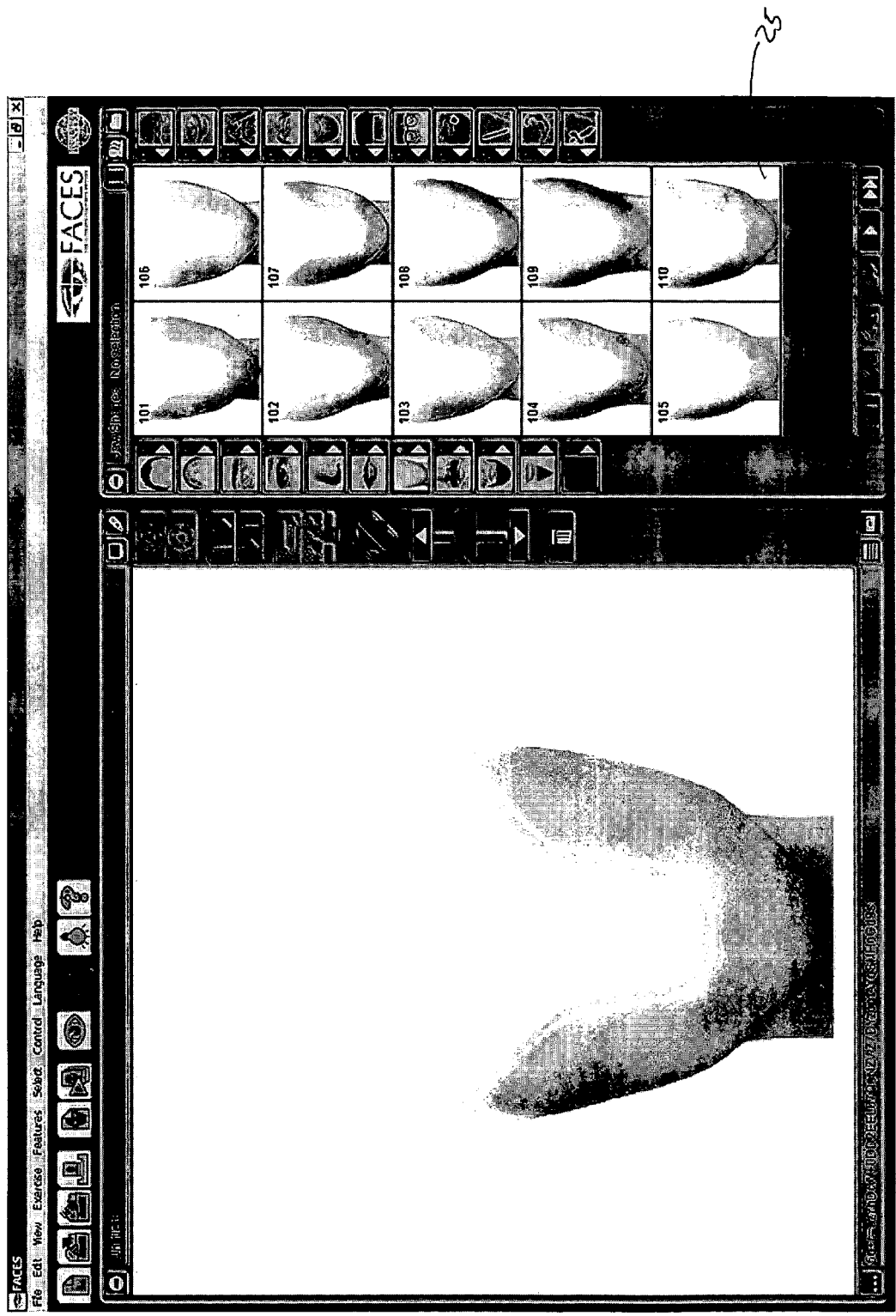
FIG. 4 is a diagram of a window that includes images of facial feature variations which may be selected to enroll or search for composite image data in accordance with the present invention.

To generate codes for enrolling composite images or for defining a search statement, the system makes various facial feature windows accessible to the user. Each window (called a list box) contains a plurality of images, all of which show variations of a corresponding one of a plurality of predetermined facial features. FIG. 4 shows one window 25 containing images of various types of jaw shapes. When performing an enrollment or search function, a user scans the various types of eyes and selects the image believed to be most relevant to the subject of interest. Image selection maybe performed, for example, by clicking on one of the thumbnail images using a mouse cursor. When selected, the image is generated in the main window. Additional windows are then accessed to make nose, mouth, jaw shape, and/or other facial features selections. With each selection, the corresponding image is overlaid or otherwise integrated onto the images of the other facial features and adjusted until a composite image is generated or until a search statement is formulated in a manner described in greater detail below.

Figure 5:
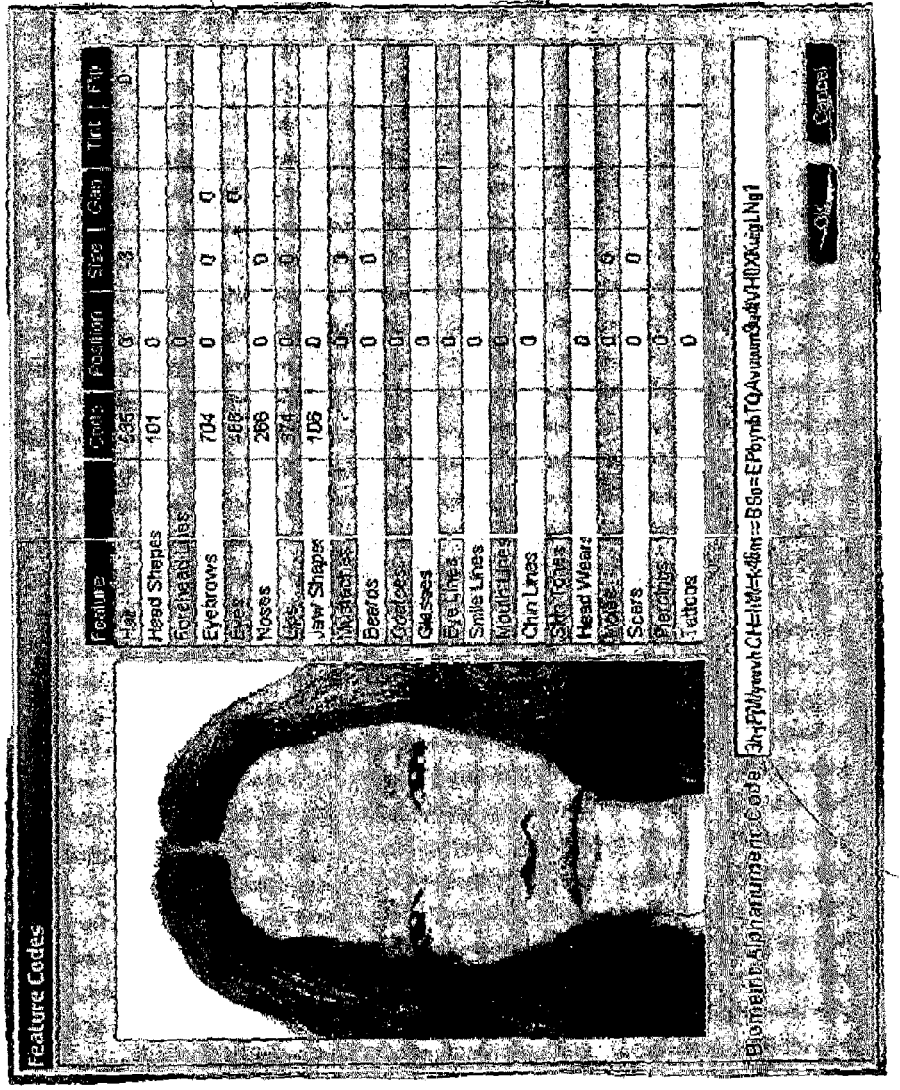
FIG. 5 is a diagram of a window showing an exemplary list of facial features eligible for selection in the system of the present invention, as well as code values and image qualifiers of facial features included in a composite facial image generated for display.

Once a selection is made from a facial feature window, an element code corresponding to the feature is shown in a facial code window 26 of FIG. 5. The code in this window is updated with element codes as more and more features are selected or modified, until the user is satisfied that enough features are selected to perform a search or to enroll an image. The number of features necessary for a search may be as few as one and as many as required to designate all the facial features offered on the system.

FIG. 5 shows a window 27 containing an exemplary list of the types of facial features which may be specified on the system. Preferably, this window reproduces the composite image in the main window and displays code values corresponding to the facial features included in the image. Window 27 may also reproduce window 26 that shows the facial code defining the image. Modifying the values in the list or code window will automatically cause corresponding changes to occur in the composite image and the facial code displayed in the code window. The list in window 27 also indicates the values corresponding to a predetermined number of image qualifiers used to generate the composite image shown in the main window.

Digital files corresponding to the images in the facial feature windows may be stored in the database, the system memory unit, or a separate memory or computer readable medium. As will be explained in greater detail below, each of the digital image files is assigned a predetermined element code. When a composite image is formed, the element codes corresponding the facial features in the image are combined to form a facial code. This code maybe processed and stored with facial codes defining other composite images in the database in a manner which will allow them to be searched in accordance with the methods of the present invention.

To initiate a search in accordance with the present invention, a search statement must first be formulated by or with the assistance of a user. This may be accomplished in a variety of ways, which include designation of an entire facial code or one or more portions of a facial code. The structure of the facial codes and the manner in which they are stored, accessed by a search, and then used to generate composite images will now be discussed.

Facial Code Generation and Data Structure

The generation of facial codes and their incorporation into a database or other archival medium is performed during an enrollment function of the composite image-generating program. As previously indicated, the program may be executed by the systems of FIG. 1 or 2.

The memory unit of or a medium connected to this system includes of a set of modules, namely a library of pictorial entities and image qualifiers and program instructions which interact with the library of pictorial entities and image qualifiers to create a facial image. The memory unit or medium may also include symbols where each symbol is associated with a respective one of the pictorial entities and image qualifiers in the library of pictorial entities and image qualifiers. The medium may further include a set of code factors, each code factor being associated to a set of symbols. A given code factor is preferably larger than the largest symbol in the set with which it is associated. The medium further comprises an encoding program element which is used to encode a composite facial image.

The data structures included in the database will now be explained in greater detail. Each pictorial entity in the library corresponds to an image of a facial part or accessory (e.g., glasses, earrings, etc.). The pictorial entities in the library are organized into morphological classes, each class describing a part of the face. In a preferred embodiment, the following basic morphological classes are used: hairstyle, forehead, eyebrows, eyes, nose, mouth, chin, moustache, beard, wrinkles and glasses. The images may be compressed in a format suitable for graphical storage such as a bitmap (BMP), GIF, or JPEG file format. Other file formats may be used if desired.

Each pictorial entity is identified by a pictorial entity symbol. The pictorial entity symbol preferably includes or corresponds to a sequence of alphanumeric characters. The symbols maybe stored in the database. Each image qualifier in the library is a characteristic of a corresponding class. The image qualifiers may be organized into qualifier types, each describing a certain characteristic of the pictorial entity. The qualifier types may specify position, color, zoom (size), or other visual effects of corresponding pictorial entities as displayed within the composite facial image. Each image qualifier is preferably represented by an image qualifier symbol, which, for example, also may be a sequence of alphanumeric characters.

A basic morphological element includes a pictorial entity and a set of image qualifiers. The image qualifiers condition the pictorial, entity to alter the visual effect of the latter. For example, the image qualifier may modify the position, color, zoom or any other visual effect of the pictorial entity. A basic morphological element refers to the pictorial entity conditioned by one or more image qualifiers. Each basic morphological element is associated with an element code.

An element code contains one or more symbols. As an example, the element code for each basic morphological element includes two symbols, namely a pictorial entity symbol and a position qualifier symbol. The pictorial entity symbol identifies the pictorial entity within a given class in the library of pictorial entities and image qualifiers. Preferably, the pictorial entities of a given class are each assigned a unique symbol. The symbols need not be consecutive provided they can be ordered and the largest symbol assigned to a pictorial entity of a given class can be determined.

The position qualifier symbol provides information on the position of the pictorial entity in the facial image. Preferably, the number of possible positions for a pictorial entity of a given class is predetermined. In a specific example, there may be 5 possible positions for the eyes in a facial image. Each position is assigned a position qualifier symbol such as a number from 1 to 5 and each position qualifier symbol corresponds to a position the pictorial entity with which it is associated can acquire. Additional symbols may be included in the element symbol if desired. For example, the element code may contain a "zoom" qualifier indicating the zoom level of the pictorial entity. In another embodiment, the number of types of image qualifiers maybe predetermined, but the values or range of values for those qualifiers may not be fixed, e.g., the values or range of values may change or be modified as additional qualifiers are added or otherwise considered.

A facial image is constructed by a set of basic morphological elements. The basic morphological element present in a given facial image is said be "active" in the given image. The set of active basic morphological elements is stored in a data structure suitable for that purpose. In a specific example, this data structure is in the form of an image data table which stores a record for each class. Each record describes an element code containing one or more fields. The fields may describe the pictorial entity symbol, the position qualifier symbol as well as symbols corresponding to other qualifiers. The entries in the image data table maybe referred to as active element symbols. The following table shows an example of an image data table in accordance with the present invention.

TABLE 1

| Class | Pictorial Entity Symbol | Position Qualifier Symbol | Zoom | Depth |
|---|---|---|---|---|
| Eyes | 34 | 2 | 2 | 1 |
| Lips | 2 | 1 | 3 | 4 |

As shown in Table 1, basic morphological element of the class "EYES" with a pictorial entity symbol "34" at a position of "2" is active in the facial image. (While the image data table is shown as having three columns, the number of columns in this table is not fixed and may, for example, be modified to include image qualifiers in addition to or instead of position, e.g., shadow, depth, zoom, etc.)

The number variations in each of the symbols for each of the classes is stored in a table, referred to as a code factor table. The code factor table provides information about the number of possible variations in a facial image. For each class, the code factor table stores a record containing a set of fields, each field describing a maximum factor. The maximum factor in the code factor table is preferably the largest symbol assigned to an image qualifier or a pictorial entity for a given class.

Alternatively, the maximum factor may be larger that the largest symbol assigned to an image qualifier or pictorial entity for a given class. This maybe understood in view of a specific example of a code factor table shown below:

TABLE 2

| Class | Maximum Pictorial Entity Factor | Maximum Position Qualifier Factor |
|---|---|---|
| Eyes | 900 | 5 |
| Lips | 600 | 26 |

In Table 2, there are two classes namely "EYES" and "LIPS" having "900" and "600" as their maximum pictorial entity factors respectively. In this example, the pictorial entities are assigned numerical symbols no larger that the maximum factor for each respective class. (Table 2 is only illustrative, as additional columns may be included to suit the requirements of a particular application.)

In the case where pictorial entities are not assigned consecutive numerical symbols, the second column would contain the largest pictorial entity symbol assigned to the pictorial entities of the respective class. The third column includes the maximum position qualifier factor. Class "LIPS" for example has "26" as is maximum position qualifier factor. In this example, positions for the individual pictorial entities are predetermined. Each predetermined position is given a numerical position symbol that is between 1 and the maximum position qualifier factor in the code factor table.

Figure 6:
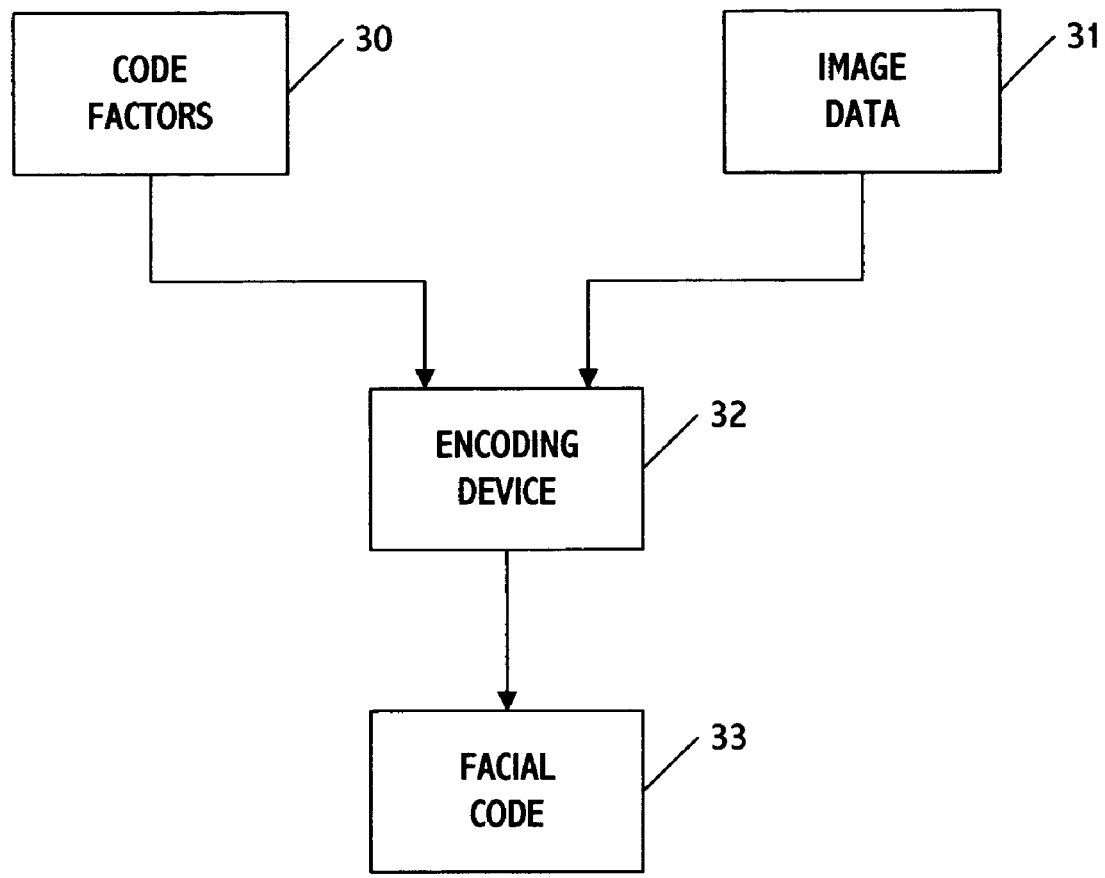
FIG. 6 is a high-level block diagram of functional units of an image system including an image encoder in accordance with an embodiment of the present invention.
Figure 8:
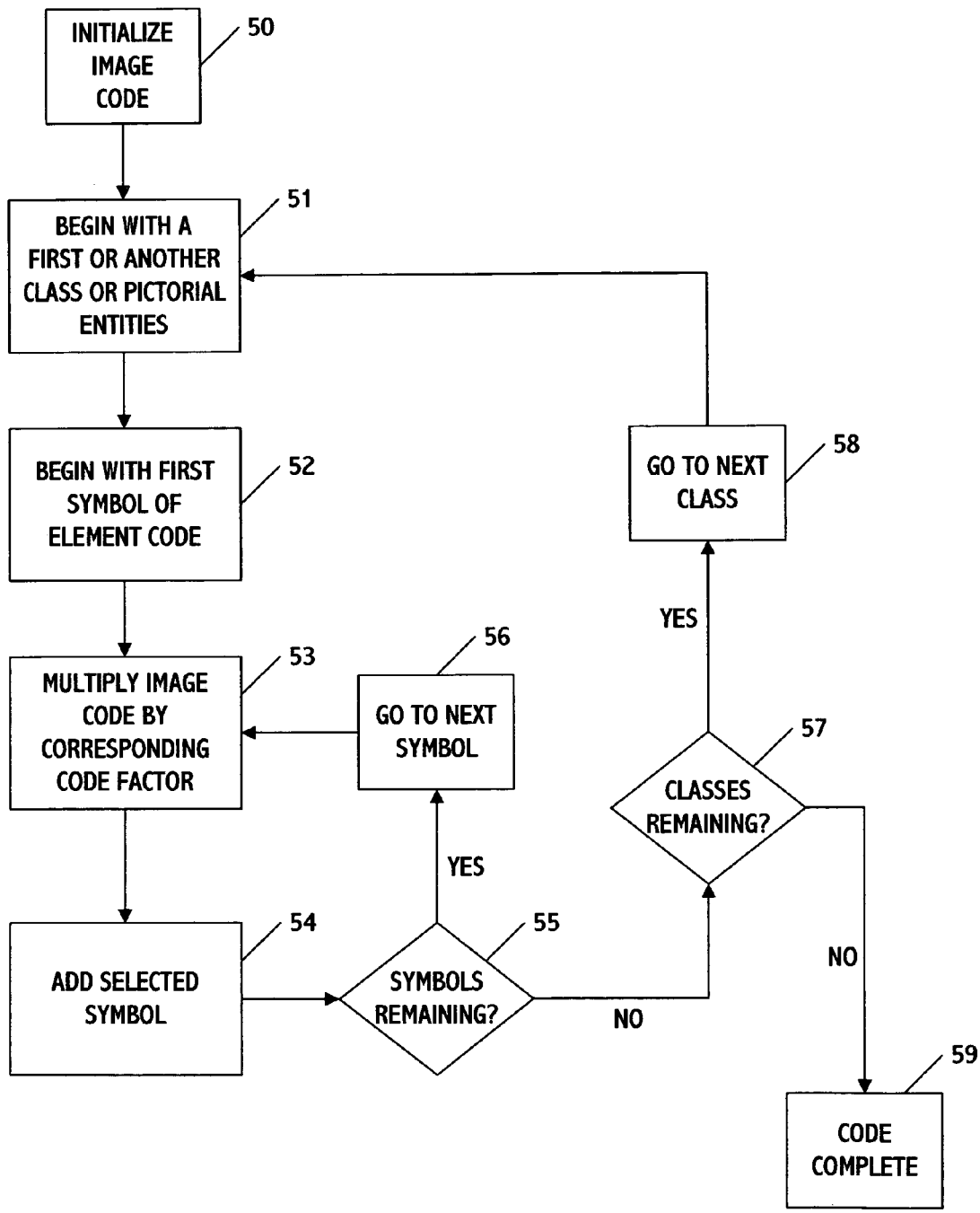
FIG. 8 is a flow chart of an encoding process in accordance with an embodiment of the present invention.

As shown in FIG. 6, a facial code for a given composite image may be created by combining the code factors 30 and the image data 31 with an encoding device 32. In a preferred embodiment, the encoding device derives the facial code in accordance with the process shown in FIG. 8.

Initially, the facial code is initialized at a base value 50, e.g., zero. The encoding method then begins with the first class of the pictorial entities 51 and the first symbol of the element code of the class 52. The facial code is first multiplied 53 by the corresponding factor value in the code factor table. An example referencing factor Table 2 illustrates this step.

If class "EYES" for the pictorial entity is being considered, then the facial code is multiplied by the pictorial entity factor "900". Following this, the pictorial entity symbol from the image data table is added 54 to the facial code. An example referencing image data Table 1 illustrates this step, e.g., if class "EYES" for pictorial entity is being considered, then the pictorial entity symbol "34" is added to the facial code.

The process then proceeds to step 55, which involves checking if there are any symbols remaining for the current class. If in the affirmative, which symbol to consider next is determined in step 56. In the above example, the next symbol to consider is the position qualifier symbol. The method then restarts at step 53.

In the event that all symbols for the class have been processed, step 55 in answered in the negative and the system proceeds to step 57 to check if there are any classes remaining. If yes, the method proceeds to step 58 to determine which class should be considered next. In the example, the next class to consider is "LIPS." The method then restarts at step 52 with the first symbol of the element code of the new class. When all classes have been processed, step 57 is answered in the negative and the method proceeds to step 59 with the complete facial code.

In a variation, the facial code may be further comprise version number information for the purpose of differentiating between different version numbers of the composite picture system. This, in turn, ensures that a composite picture system using the facial code produced by the process described above is not induced in error if its version is not the same than that of the composite picture system that created the image. A specific example contemplates integrating the version number information with the facial code by multiplying the code by a specific number.

Preferably, the facial code is a number in a given base. Preferably, a large base is used in order to obtain a reduced number of characters in the facial code. The facial code may be, for example, a number in base of "62" with characters 0–9, a–z, A–Z. Other bases maybe used if desired. To keep the number of characters in the code generation low (e.g., steps 53 and 54), it may be preferable to provide some specialized functions for the computation of the multiplication and addition operations to avoid the possibility of overflow. The implementation of such computations are readily available to persons skilled in the art.

In another variation, characters in the facial code that may be visually confusing are replaced by non-alphanumeric characters. For instance, the letter "O" and the number "0" are similar in appearance, as are the letter "I", the letter "l" and the digit "1". To differentiate between them, visually confusing characters maybe replaced by non—alphanumeric typographic symbols (*, &, %, @, etc.) once the code is generated.

Figure 7:
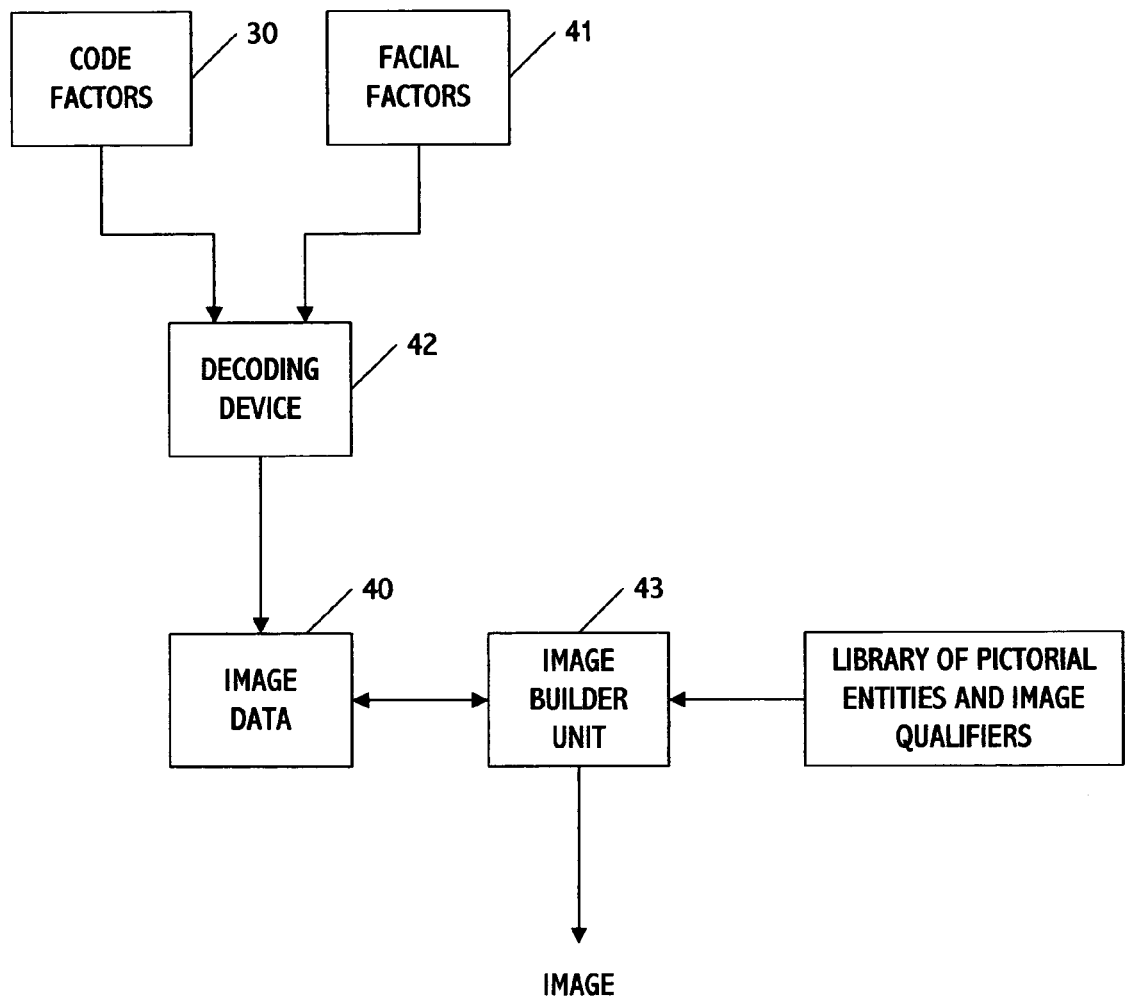
FIG. 7 is a high-level block diagram of functional units of an image system including an image decoder in accordance with an embodiment of the present invention.

Each facial code is used to define a composite facial image. As shown in FIG. 7, facial image data 40 maybe obtained by combining the code factors 30 and the facial code 41 with a decoding device 42. The facial image data 40 is obtained by applying the inverse operations in the reverse order than those applied in the encoding process to the facial code. In a preferred embodiment, the decoding device delivers the facial image data 40 according to process shown in FIG. 9.

The image code is first obtained in step 60. Then, the decoding process begins with a predetermined class (e.g., the last class) of the pictorial entities 61 and the last symbol of the element code of that class 62. The facial code is first divided in step 63 by the factor value in the code factor table associated with the symbol being considered. An example referencing factor Table 2 illustrates this step.

If the class "GLASSES" for the position qualifier is being considered, then the facial code is divided by the factor "23". Following this, the remainder of the division performed in step 63 is stored as the corresponding position qualifier symbol in the image data table 64. When all symbols in the current class have been processed, step 65 is answered in the negative and the method proceeds to step 66 to check if there are any symbols remaining for the current class. If in the affirmative, the method proceeds to step 67 determine which symbol to consider next.

In the above example, the following symbol to consider is the pictorial entity symbol. The system then restarts at step 63. In the event that all symbols for the current class have been processed, step 65 is answered in the negative and the method proceeds to step 66 to check if there are any classes remaining. In yes, the method proceeds to step 67 to make a determination as to which class to consider next.

In the example above, the next class to consider is the "LIPS" class. The system then restarts at step 62 with the last symbol of the element code of the new class. In the event that all classes have been processed, step 66 is answered in the negative and the method proceeds to step 68 with the image data table is considered to include a complete description of the image described by the facial code. The image data table can then be used by the composite picture system to access the library of pictorial entities and image qualifiers and produce a composite facial image.

As shown in FIG. 7, the image data 40 is stored in an image data table that preferably can be accessed by an image builder unit 43. The image builder unit accesses the library of pictorial entities and image qualifiers of the composite picture system to extract the pictorial entities specified by the image data. The image builder also extracts the image qualifiers specified by the image data and is operative to condition the pictorial entities based on the these extracted image qualifiers. The builder unit then outputs an image which maybe displayed to the user of the composite picture system. Extraction of data elements from a database may be performed using any one of a variety of methods well known in the art.

In the event that the facial code comprises version number information, the reverse operation used to embed the version number in the facial code is applied to the facial code during the decoding process. In a specific example where the version number information is integrated in the facial code by multiplying the code by a specific number, the decoding process involves dividing the facial code by that number.

In the event that characters in the facial code that may be visually confusing were replaced by non-alphanumeric characters, the reverse operation is performed on the facial code.

An example of a typical interaction will better illustrate the functionality of the encoding module implemented by the program instructions of the composite picture system using the data components.

Figure 10:
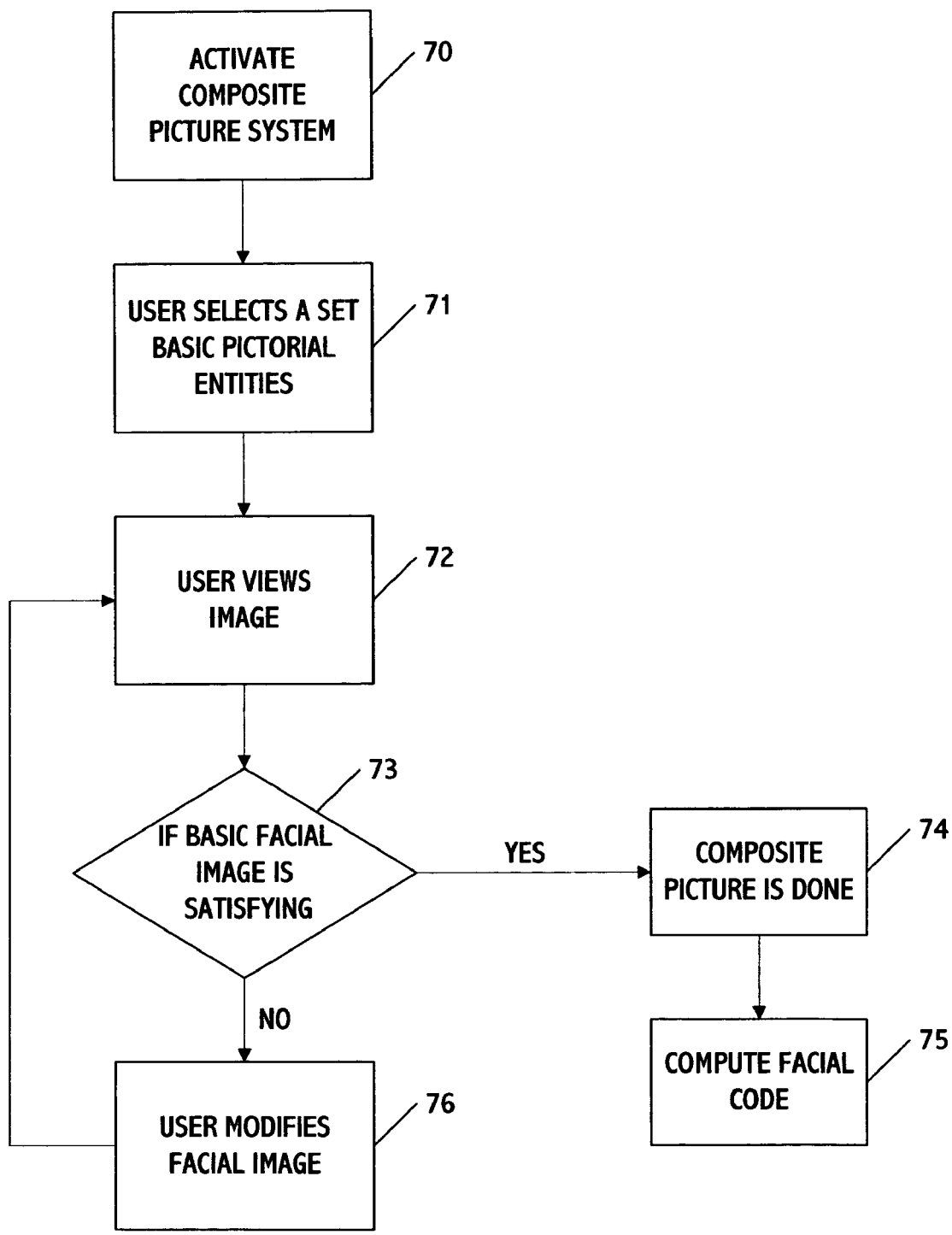
FIG. 10 is a flow chart showing steps included in a process for creating an image and corresponding facial code in accordance with an embodiment of the present invention.
Figure 11:
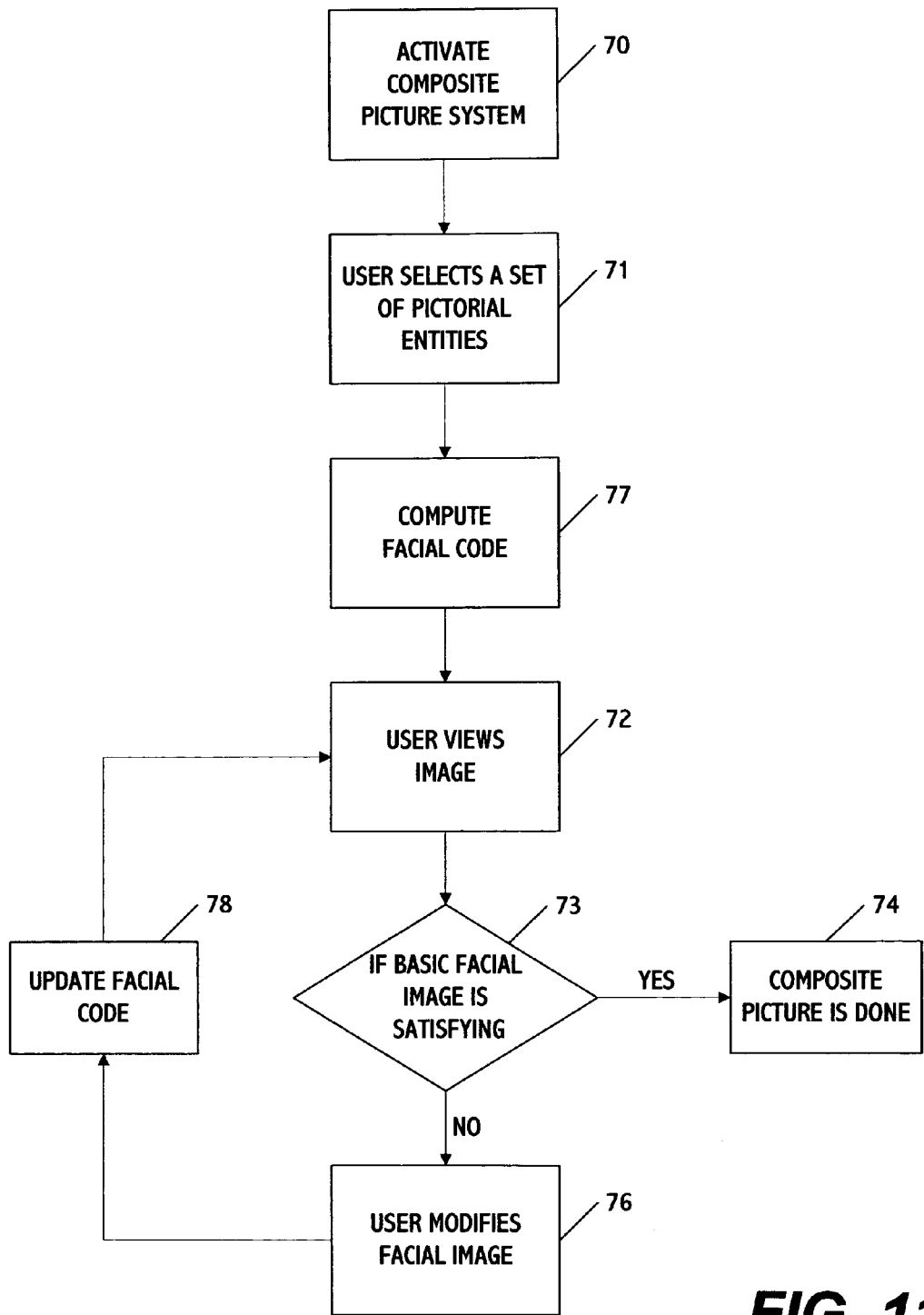
FIG. 11 is a flow chart showing additional steps of the process of FIG. 10 for creating an image and corresponding facial code in accordance with an embodiment of the present invention.

In a typical interaction, shown in FIGS. 10 and 11, once the composite picture system is activated in step 70, the user selects a set of pictorial entities 71 through a user interface. The interface to the composite picture system may be a keyboard, pointing device, touch screen or any other suitable input means. The received input maybe an address of the memory location where a given pictorial entity is located or some other way of identifying it. The selection is entered in the image data table in association with corresponding qualifier symbols. Preferably, the pictorial entities in a given access are assigned default qualifier symbols.

Once the system has received the request, the entries in the image data table are used to locate in the library of pictorial entities and image qualifiers the entries corresponding to the received input. When a pictorial entity or image qualifier is selected, it is considered to be active. Next, the selected pictorial entities and image qualifiers are combined to form a facial image. The combination is performed by positioning each active pictorial entity in a same frame at the location specified by the position qualifier in the image data table. The system then displays the facial image to allow the user to view it in step 72.

Alternatively, after each selection of a pictorial entity, the systems displays it to allow the user to view the image as it stands with the current selection of pictorial entities. At condition 73, if the user is satisfied with the appearance of the facial image, the composite picture is complete at 74. The completeness of the image may be indicated by a user inputting a command indicative that the image is complete. The image data table is then processed by the encoding process to compute the facial code at step 75.

The user of the system may then make use of the facial image and facial code as he pleases. For example, the user may print the resulting facial image, he may store the image by storing the facial code computed at step 75, or he may transmit the image to an external site by transmitting the facial code. In the event the user is not satisfied with the appearance of the facial image, the user may modify the facial image 76.

Modification of the facial image may comprise different operations. For example, the user may replace a pictorial entity by another of the same class, the pictorial entity may be removed all together, or the element maybe displaced in the vertical or horizontal direction. In a specific example, the user interface may include an functional setting, such as arrows in the user interface, for displacing the pictorial entities in the vertical and horizontal directions. The arrows may be linked to functional modules that modify the position of the selected image in the screen.

When the pictorial entity is displaced, the corresponding position qualifier symbol in the image table is also modified such as to reflect to current positioning of the pictorial entity. The user may select via a pointing device or other input means the element he wishes to displace in the facial image. The user then uses the displacement arrows to position the pictorial entity in the desired position in the facial image. Many variations in the user interface are possible and implementations different from the one presented above do not detract from the spirit of the invention. For every modification performed in step 76, the image data table is updated accordingly.

Once the facial image has been modified by selecting a revised set of pictorial entities and image qualifiers, the latter are combined to form a facial image. The system then displays the facial image as described in the image data table to allow the user to view it at step 72.

Alternatively, after each selection of a pictorial entity or image qualifier, the systems displays it to allow the user to view the updated image as it stands with the current selection. The process continues until the user is satisfied with the image and when condition 73 is answered in the affirmative the method proceeds to step 74.

In a variation, the facial code maybe computed incrementally as the user selects pictorial entities and image qualifiers and modifies the facial image. Following step 71, the image data table is processed 77 by the encoding unit to compute the facial code corresponding to the data in the image data table. The facial image may then be modified in accordance with steps 72, 73, and 74.

Following step 76, the image data table is reprocessed by the encoding unit 78 to compute the facial code corresponding to the updated data in the image data table. In this variant, the facial code for the image being created is computed as the user creates the image. Once the user stops entering new modifications, the code is readily computed without the need for the user to input a command indicative that the image is complete.

In another typical interaction, the composite picture system may receive as input the facial code describing a facial image. Using this facial code, the composite picture system reconstructs the facial image. Therefore, the user interface may also include a means for entering the facial codes.

Figure 9:
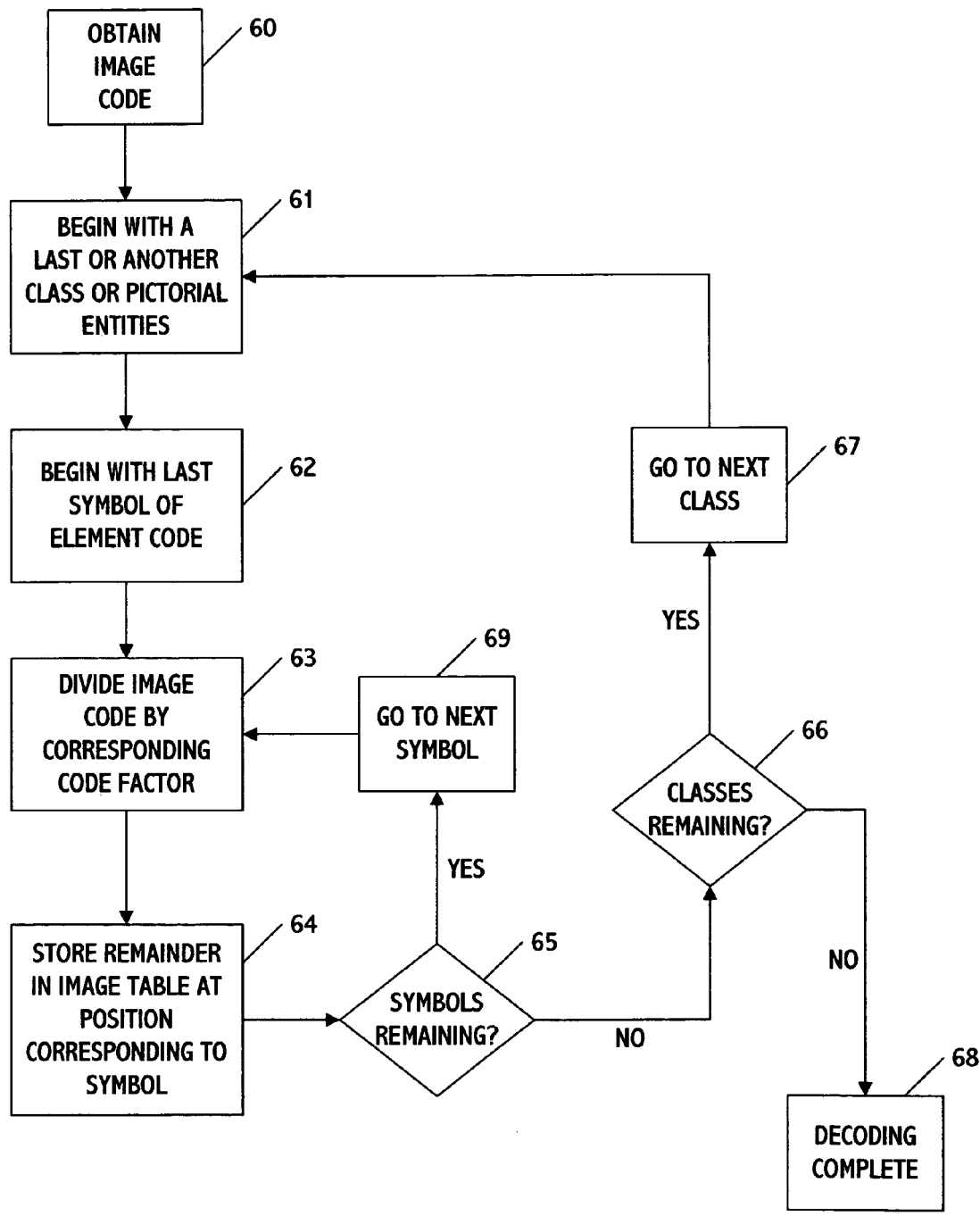
FIG. 9 is a flow chart of a decoding process in accordance with an embodiment of the present invention.

The facial code is first decoded by the process in FIG. 9 to produce an image data table containing information for generating the facial image. The system accesses the library of pictorial entities and image qualifiers and extracts the pictorial entities and image qualifiers corresponding to the data contained in the image data table. The image is then displayed to the user which may make use of it as he please by modifying it, storing it, printing it or transmitting it.

Figure 12:
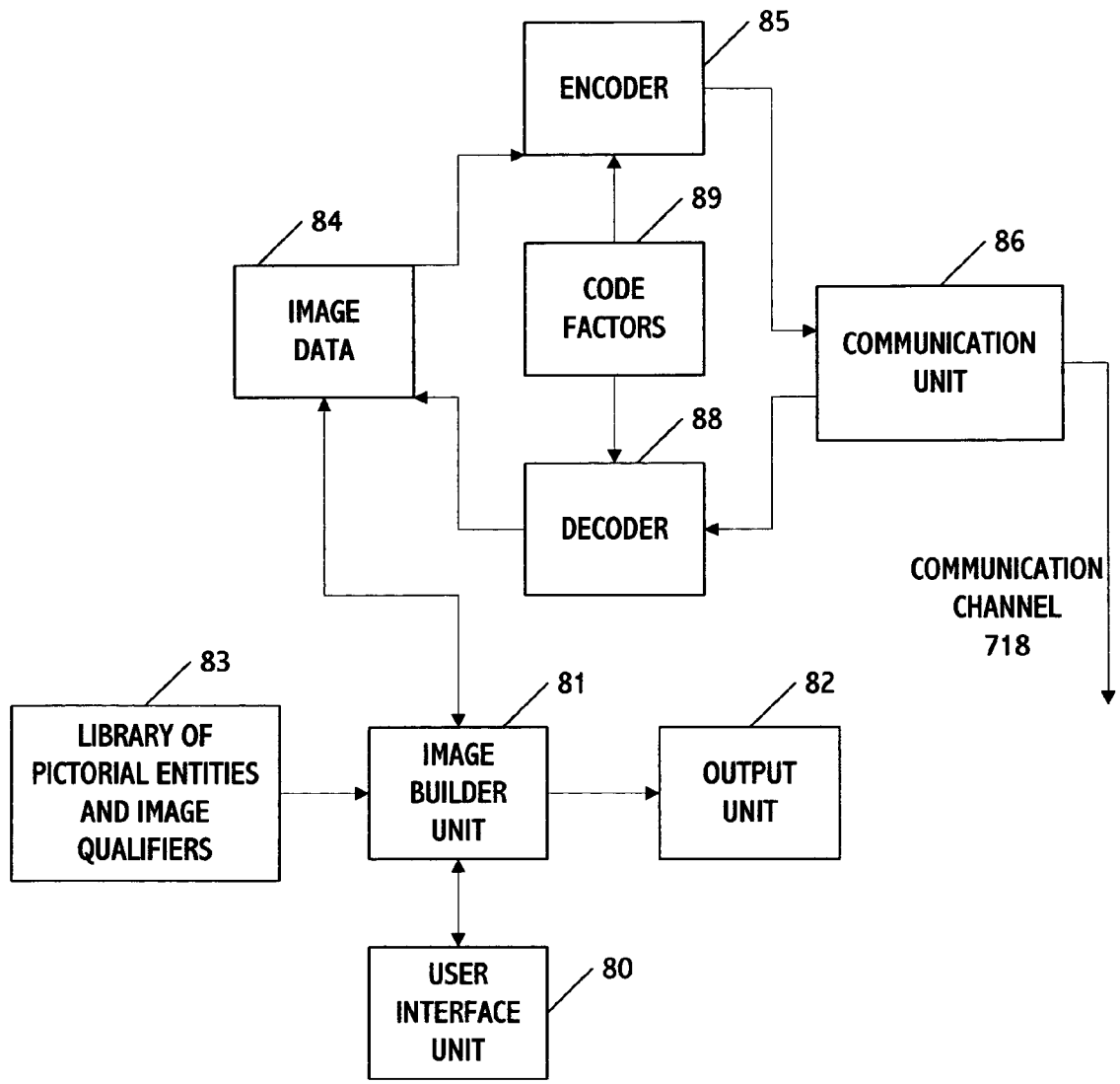
FIG. 12 is shows another system for encoding and searching image data in accordance with the present invention.

FIG. 12 shows an alternative embodiment of a composite image-generating system in accordance with the present invention. The system includes a user interface 80 such as a touch screen, mouse, keyboard are any other suitable input means for communicating with the user of the image system. The user interface communicates with an image builder unit 81 operative to generate graphical data on the basis of a given set of input data elements. The image builder unit maybe implemented on a general purpose computing platform running an application software of may be a dedicated CPU unit programmed specifically for the purpose of generating images. The image builder unit communicates with an output unit 82 such as a display unit or a printer unit to send the generated graphical data for output to the user.

The image builder unit also communicates with a library of pictorial entities and image qualifiers 83. The library of pictorial entities and image qualifiers may be implemented on a computer readable medium such as a hard disk, CD-ROM, non-volatile RAM or any other suitable device The image builder unit also communicates with a computer readable medium including image data 84. The image data specifies the pictorial entities that are active in the given image as well as any other relevant image qualifier such as position and zooming. The image data may also be modified by the image builder unit to update its entries on the basis of inputs received by the image builder unit from the user through the user interface.

The image data can be accessed by an encoder 85 operative to encode the image data according to the process described in this specification. The encoder may be implemented on a general purpose computing platform running an application software in accordance with the process described or may be a dedicated CPU unit programmed specifically for the purpose of encoding image data. The encoder outputs the image code. The encoder may further communicate with a communication unit 86 such as a modem, network card or any other suitable communication devices suitable for transmitting data information over a communication channel 87. The image data can be accessed by a decoder 88 operative to decode an image code according to the process described in this specification. The decoder maybe implemented on a general purpose computing platform running an application software in accordance with the process described or may be a dedicated CPU unit programmed specifically for the purpose of decoding image codes. The decoder outputs the image data that is inputted to the computer readable medium containing image data. The decoder may further communicate with the communication unit in order to receive image codes. The encoder and decoder also communicate with a computer readable medium including element code factors 89.

The facial code produced by the code-generation process described above allows each facial image to be described with a very small number of characters compared to a graphical representation permitting the radio transmission of the composite picture over data transmission medium. For example, a police station at one site using an embodiment of the invention can transmit the entire composite picture of a suspect to police station at another site by simply sending the facial code for that facial image either verbally or through an electronic communication means. A user at the police station at the receiving side then enters the code into the composite picture system, resulting in display of the composite facial image.

The data transmission medium between the police stations maybe a telephone line with a set of modems, and Ethernet connection, the Internet or any other communication medium suitable for the transfer of data. In the above example, the two police stations have on their local site a composite picture system of the present invention. A copy of the library of pictorial entities and image qualifiers are then stored at each site and only the code needs to be transferred.

Advantageously, the invention further allows the storage of a facial image by storing the facial code only on a computer-readable medium. This may result in substantial savings in terms of memory requirements for storing the images since only a single instance of each pictorial entity and image qualifier needs be stored, the instance being in the library of pictorial entities and image qualifiers.

A system and method (or program) for encoding/decoding image data of the aforementioned type is disclosed in U.S. patent application Ser. No. 09/322,932, filed on May 28, 1999, the contents of which are incorporated herein by reference.

Search Method Embodiments

The various embodiments of the search method of the present invention may be performed by any of the systems previously described and preferably with the assistance of the graphical user interface shown in FIG. 3, although other graphical user interface designs maybe used if desired. In these systems, the facial codes, code factors, and other information used to define composite facial images are stored in an internal, peripheral, or remotely located database such as previously described. Alternatively, this information may be stored in an internal hard drive, a peripheral storage unit, or a fixed or removable a computer-readable medium which, for example, may be optical or magnetic in nature. The digital image files used to generate the features defined by the codes are also stored on one of these storage devices or mediums.

Search functions, graphical user interface control, development and storage of codes and other forms of data, enrollment of composite images, and other processing and management functions are preferably performed by the processing unit, under control of the composite-image generating program and user input information. The processing unit uses the codes as a basis for retrieving corresponding digital image files, which are then combined to form composite facial images for display. The processing unit is also adapted to interact with a number of peripherals including the optional image acquisition unit and the network interface previously discussed.

Figure 13:
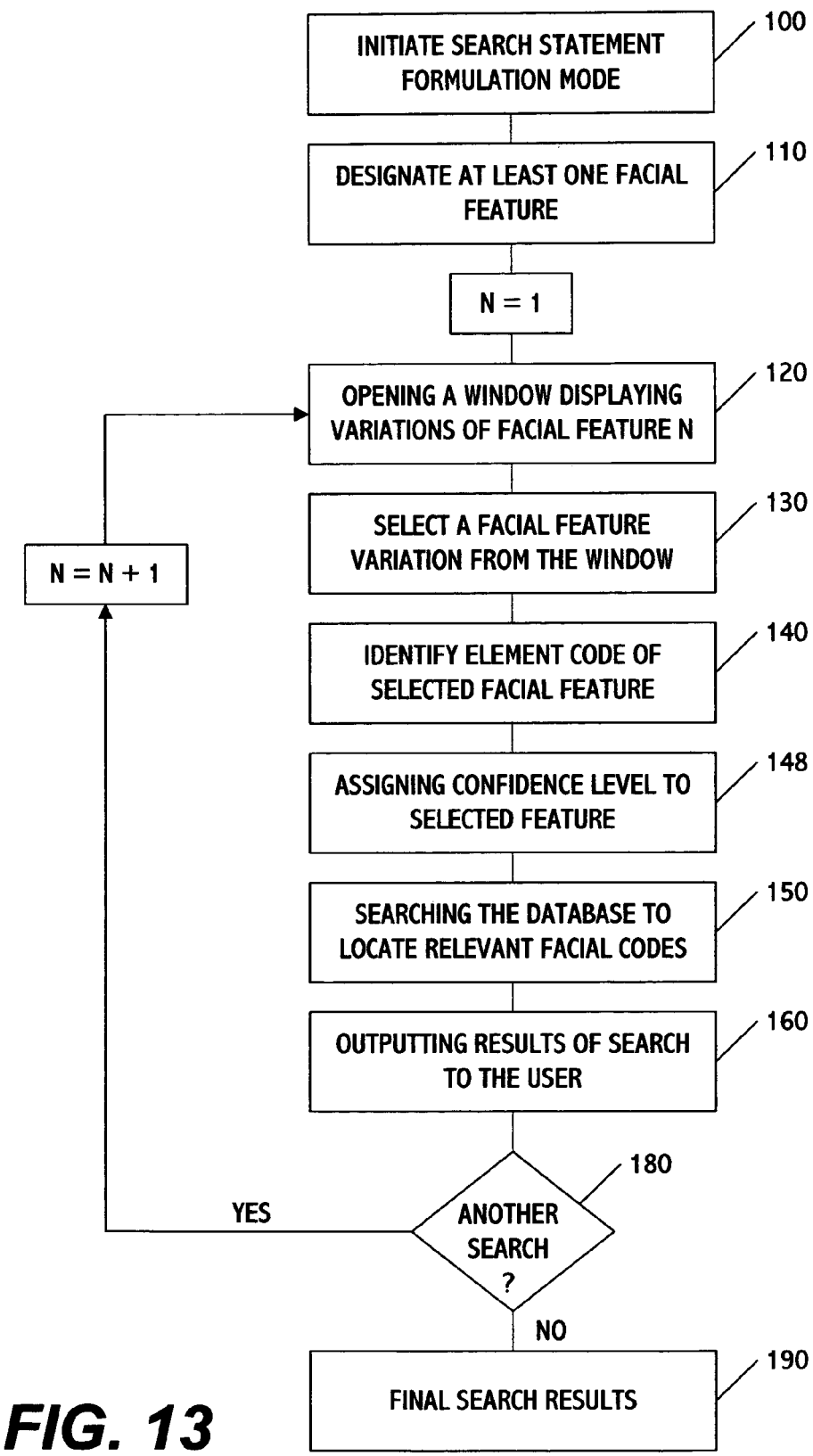
FIG. 13 is a flow chart showing steps included in a method of searching for image data in accordance with one embodiment of the present invention.

FIG. 13 is a flow chart showing steps included in a first embodiment of the method of the present invention. An initial step of the method includes entering the search mode of the composite image-generating program for purposes of generating a search statement. (Block 100). This may be accomplished, for example, by clicking on a dedicated icon on a management toolbar or through selection of an item on a drop-down menu. While the method may advantageously be implemented in a Windows-driven system, those skilled in the art can appreciate that the invention maybe adapted to function with other operating systems including but not limited to command-driven systems, the Apple operating system, Linux, UNIX, etc.

Other initial steps may include establishing a network connection to the database containing the facial codes, performing an enrollment function whereby facial codes corresponding to new composite images are entered into the database, and modifying facial codes that have already been stored in the database. In a law enforcement/terrorist application, the new facial codes may define composite facial images of newly discovered/arrested suspects or terrorists. In this case, the enrollment process may be performed on a periodic or as-needed basis.

A second step includes designating one or more facial features of a subject to be searched in the database. (Block 110). The features eligible for designation are pre-programmed into the application software and include, for example, types of hair, head shapes, forehead lines, eyebrows, eyes, noses, lips, jaw shapes, mustaches, beards, goatees, glasses, eye lines, smile lines, mouth lines, chin lines, skin tones, head wears, moles, scars, piercings, tattoos or any combination thereof. To keep the system up-to-date, the software may be written to allow an operator to add new facial features to the system based, for example, on enrollment of new images or to target features that may be unique in nature, e.g., special tattoos, unusual piercings, specific scars, facial deformations or defects, etc. The features designated by the search may be derived from information obtained from eye-witnesses who observed the subject, through examination of a video image, or from other sources.

The designation step is accomplished by initiating a program function that will enable a user to select one or more facial features of the subject. This is preferably accomplished by opening a window (which maybe referred to as a "listbox") containing images of variations of a first facial feature. (Block 120). Once the list-box has been displayed, the user selects the variation believed to match or most closely correspond to type of feature the subject of the search possesses. (Block 130). The selection maybe made using a mouse or another type of input device.

Once the selection is made, the processing unit automatically determines the element code corresponding to the selected facial feature variation. (Block 140). This may be accomplished as a result of the way in which the facial feature image files are stored. For example, each digital image file maybe associated with a corresponding element code defining the facial feature variation. Selecting an image in a list-box thus allows the processing unit to immediately determine the element code corresponding to the selected feature. This code is preferably displayed in a separate window which, for example, may be associated with the main window for displaying the composite image.

Figure 14:
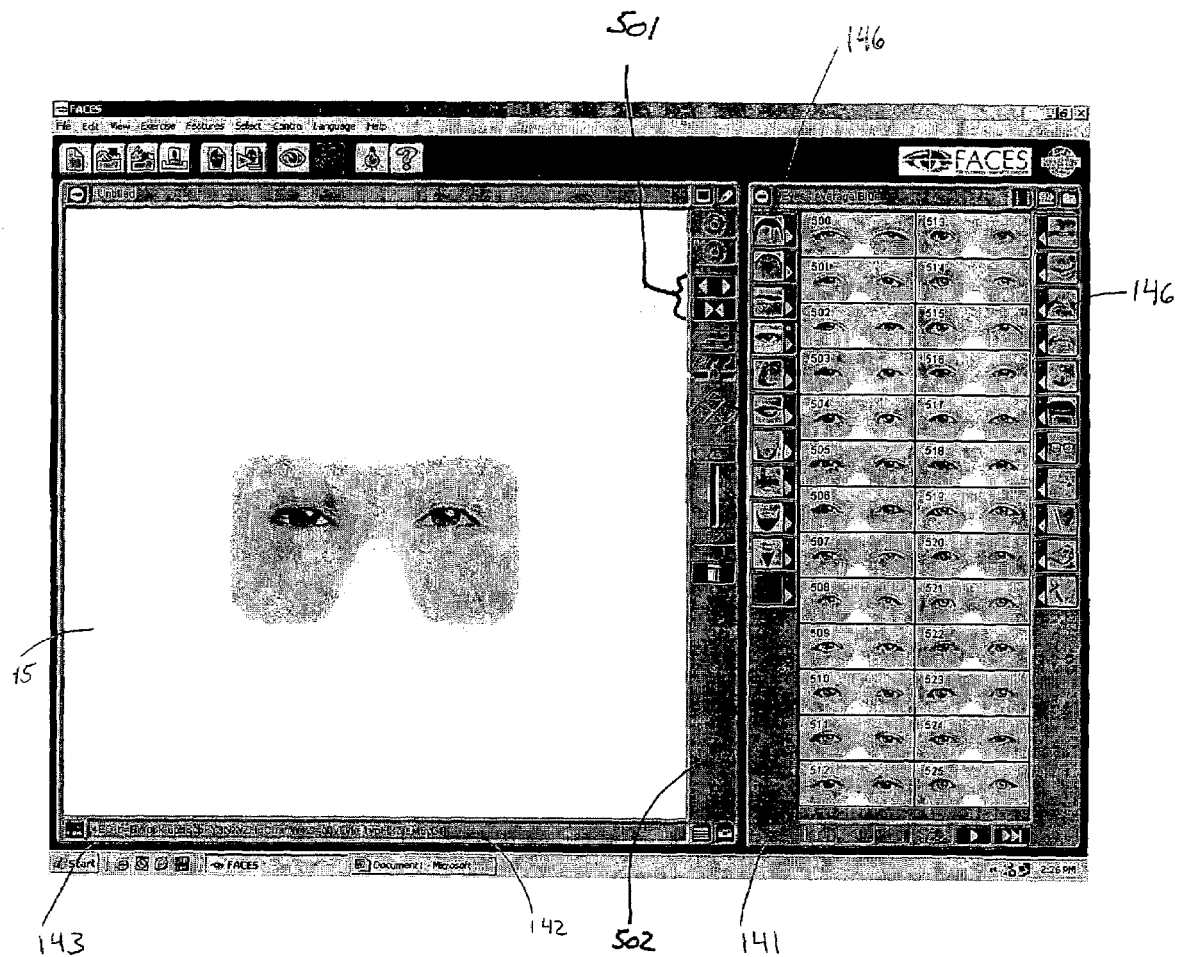
FIG. 14 is a diagram of windows included in a graphical user interface that may be used in accordance with the present invention.

FIG. 14 shows an example of a list-box window 141 containing images of different types of eyes (e.g., round, oval, etc.) which have been preprogrammed into the system. When a user selects one of the images using a mouse cursor, the resulting element code 142 is generated in a code window 143. As is also shown, when a selection is made the specific eye type corresponding to the selection is generated in the main window 145.

FIG. 15 shows an example of a table which maybe stored in memory to associate the digital image files for the eye variation with element codes. (The file names and element codes shown in this figure are arbitrarily selected as exemplary values and not intended to limit the scope of the invention in anyway.) The processing unit may access this table for purposes of filling in information in the code window. Once the element code for the first facial feature is determined, one type of search statement in accordance with the present invention has been formed.

A third step includes searching the database of facial codes based on the element code that corresponds to the selected facial feature variation. (Block 150). The database stores facial codes which are used by the processing unit to generate composite images. In order to save considerable storage space and provide control of data, the database does not store the images themselves. Each facial code may be formed from a set of element codes and a corresponding set of code factors. Each element code includes a pictorial entity symbol corresponding to a specific type of facial feature variation (e.g., round eyes, square chin, etc.) and preferably but not necessarily one or more image qualifiers. The image qualifiers specify the position, size, color, zoom, and/or other factors relating to the pictorial entity symbol included in the element code. For example, an image qualifier for a pictorial entity symbol for round eyes may adjust the spacing between the eyes.

Figure 16:
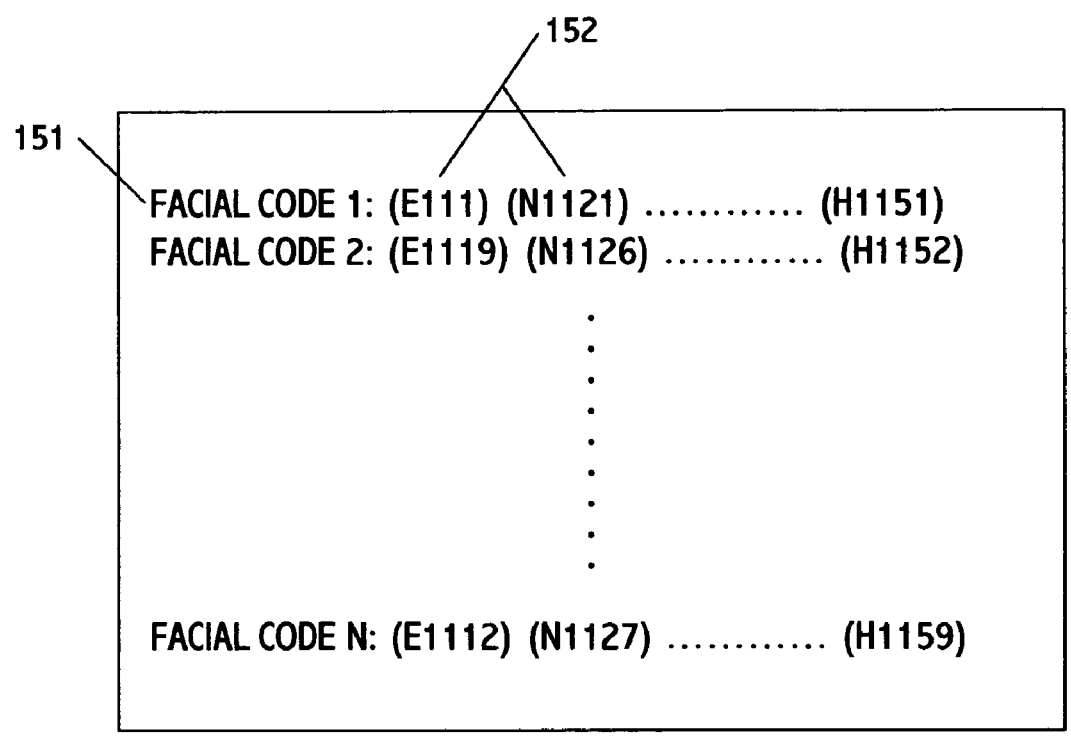
FIG. 16 is a diagram showing one format used for storing facial codes in a database or on an information-baring medium in accordance with the present invention.

FIG. 16 shows a simplified diagram of one way in which the facial codes in the database maybe stored. Facial code 151 includes a number of alphanumeric characters which, for illustrative, purposes have been partitioned into separate element codes 152 by parentheses. These element codes may, for example, define specific types of jaw shape, eyes, nose, mouth, eyebrows, and hair. Because these element codes are linked to corresponding digital image files stored in the system, they may be used as a basis for generating a composite image for display.

During the search, the processing unit searches the facial codes in the database to locate a set of codes which contain the element code selected by the user. This search may be performed using any one of a variety of searching algorithms including linear, hash, computational, and quadratic. By way of example, the linear search algorithm may perform a simple matching between the element code (e.g., facial feature) selected by the user and the elements codes included in the facial codes stored in the database. The other algorithms may be employed to locate one or more facial codes which most closely correspond to the selected element code. While no identical match may result, these algorithms are useful for purposes of obtaining the relevant results. To obtain close results, the hash search algorithm may, for example, be implemented using a predefined index table. In addition to the foregoing, other algorithms maybe used to perform the processor search including cluster algorithms, neural-network-based algorithms, and/or ones to be developed in the future.

A fourth step includes outputting the results of the search to the user. (Block 160). This may be accomplished by displaying the composite images which correspond to the facial codes located by the search. The composite images maybe displayed as thumbnail images which are enlarged when clicked on, as full size images which may be sequentially scanned, or by any other display method. By viewing the composite images generated by the search, the user can eliminate irrelevant images, change the facial feature selected to another more relevant variation, or spot additional facial features which maybe used as a basis for narrowing the search. These techniques may prove to be especially helpful when a large number of search results are returned.

The method may include a number of optional steps. One optional step includes assigning confidence level information to all or selected ones of the facial features (element codes) included in the search statement. (Block 148). This step may be performed when the facial feature selected from a list box does not exactly match the subject of the search. For example, the list box for eyes may only include a finite number of eye types. The eye type the subject is believed to have may not exactly match any of the eye types in the list box. In this case, the user may select the eye type from the box believed to most closely match the subject's eyes and then assign confidence level information to that selection. (Block 170). The confidence level information may then be used as a basis for outputting the results of the search, for example, in sorted order, or as a basis for judging the overall confidence in the overall search results.

The confidence level information maybe a number within a predetermined confidence level range. For example, a range of 1 to 10 may be used, where the value of 1 indicates a very low confidence that the composite image is relevant and a value of 10 indicates a very high confidence that the image is relevant. Alternatively, a percentage may be used, e.g., the selected facial feature is 80% accurate. Another approach to assigning confidence levels maybe take image quality into consideration or maybe based on the use of questionnaires. These may be automated if desired. The assigned confidence values are preferably stored in a temporary memory area in association with the facial codes returned by the search. While this step of the method is considered to be optional, it may prove to be very beneficial when outputting search results when the method is implemented with multiple iterations.

Another optional step involves allowing the user to perform second or subsequent searches to narrow the search results. (Block 180). A second search is preferably performed by returning process flow back to Block 120. At this point, the user would access a list box to display variations of a second facial feature of interest. This maybe accomplished, for example, by clicking on an appropriate icon located on one or more feature toolbars 146 on the display screen. Once this new list box is displayed, a selection is made and the element code corresponding to the selection is identified. To provide visual confirmation, the digital image corresponding to the selection is overlaid or otherwise integrated with the image of the first facial feature variation selected by the user. A second search is then performed to locate which facial codes generated from the first search include the element code corresponding to the second facial feature variation selected. The results may then be displayed. In this second iteration, confidence levels may be assigned to the newly selected facial feature and/or the confidence level assigned to the previously selected facial feature may be modified, for example, based on the search results from the first iteration, to obtain improved results.

The search iterations may continue a desired number of times until a composite image is found which matches the subject of the search or until one or more images are found which have a high likelihood of matching the search subject. (Block 190). During the final or any subsequent iteration, the composite images may be sorted based on the confidence level values assigned. Because search results are narrowed in a stepwise fashion, this embodiment of the present invention maybe considered to take a sequential converging approach to searching for images in the database.

Figure 17:
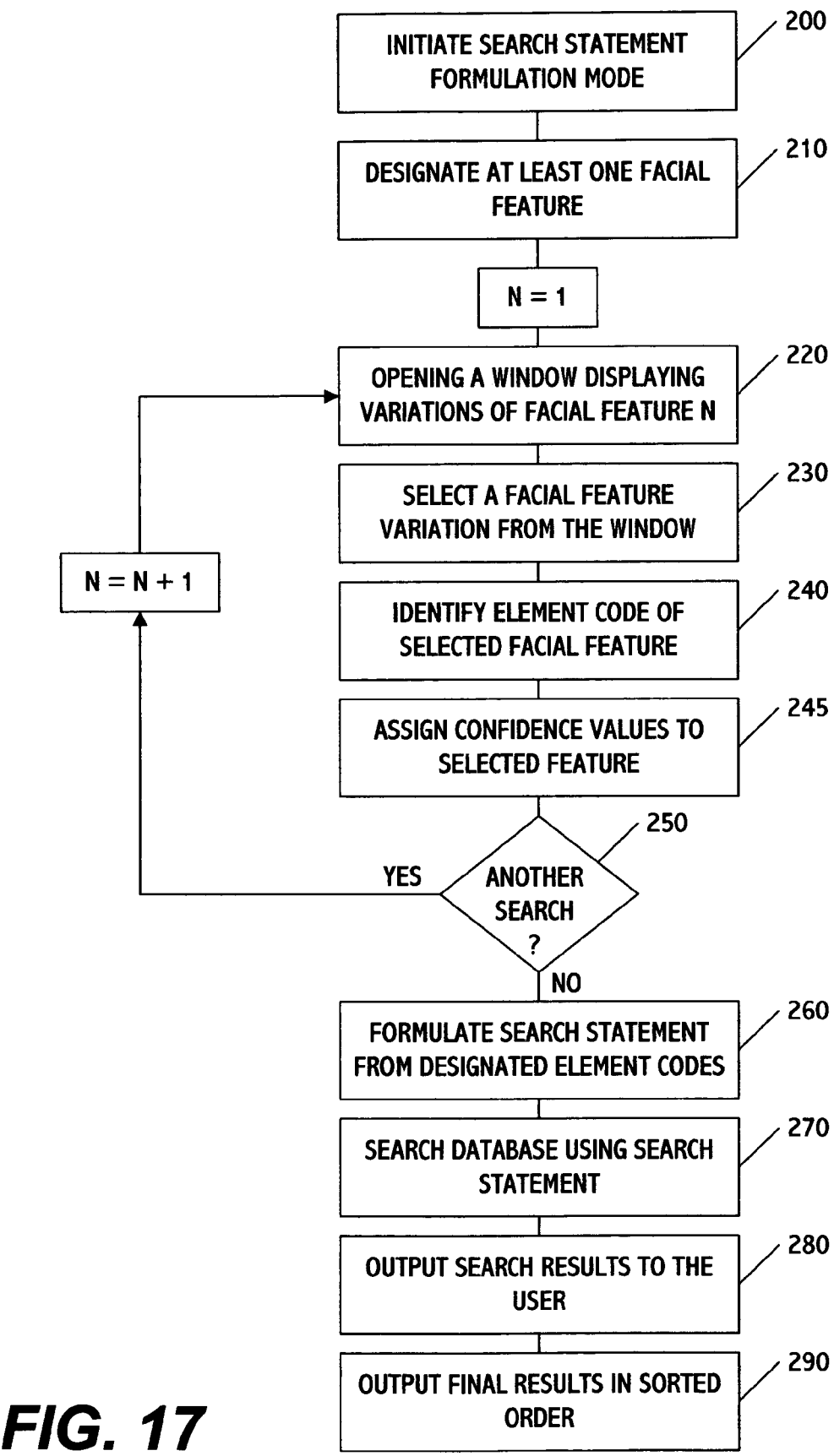
FIG. 17 is a flow chart showing steps included in a method of searching for image data in accordance with another embodiment of the present invention.

FIG. 17 is a flow chart showing steps included in a second embodiment of the method of the present invention. In this embodiment, a compound search statement is designated by a user before a database search is performed. (Blocks 200 and 210). This involves accessing a list-box window containing images corresponding to variations of a first facial feature (Block 220), selecting one of the images (Block 230), and then identifying the element code corresponding to the selected image (Block 240). In a subsequent optional step, confidence level information maybe assigned to the selected image. (Block 245). The user is then allowed to designate one or more elements codes until a desired number of codes (or facial features) have been selected. (Block 250). A search statement is then formulated from the designated element codes. (Block 260). Blocks 200 and 210 maybe performed in a manner similar to Blocks 100 and 110 respectively.

At any point during or after designation of the element codes, the user is allowed to define the manner in which the codes are to be related in the compound search statement. For example, each of the element codes may form different terms in a Boolean search statement. The user may, for example, insert "AND" and "OR" operators between the element codes as a way of revising the search statement. A default condition may exist where all the terms in the search statement are connected by "AND" operators unless otherwise specified by the user. Insertion of these operators may be performed with the assistance of a toolbar, and the resulting compound search statement may be depicted in the code window.

Once the search statement has been formulated in a manner desired by the user, the processing unit searches the facial codes in the database. (Block 270). Once the search results are returned (Block 280), they are output (e.g., in sorted order) for review by the user. If desired, the search results may be narrowed by modifying the search statement to include element codes corresponding to different and/or additional facial feature variations. This may be followed by subsequent steps which includes assigning new or different confidence values to the narrowed search results. Once final results have been obtained, the composite images may be displayed in an order sorted by confidence values. (Block 290).

Figure 18:
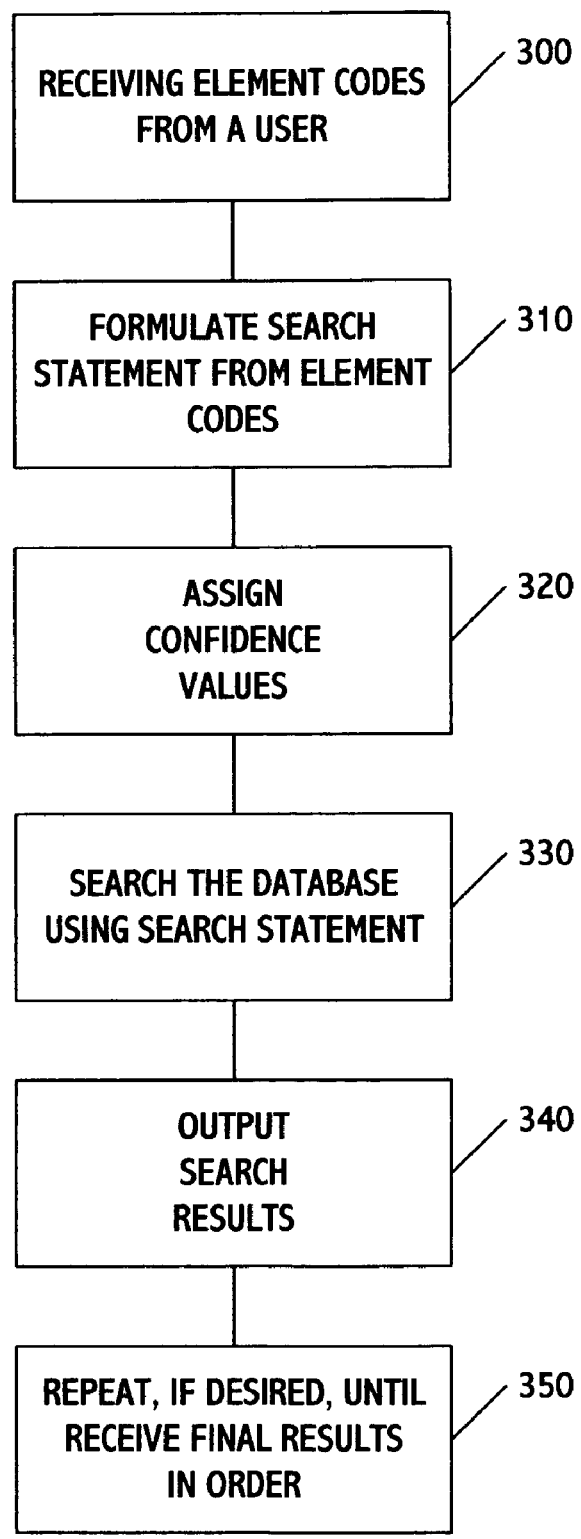
FIG. 18 is a flow chart showing steps included in a method of searching for image data in accordance with another embodiment of the present invention.

FIG. 18 is a flow chart showing steps included in a third embodiment of the method of the present invention. In this embodiment, a search statement is designated as a result of a user inputting one or more of the element codes themselves into the code window. (Block 300). This embodiment requires that the user either have a foreknowledge of the element codes themselves or a resource that can be used as a basis for looking up the codes. A search statement is then formulated which may relate the codes using, for example, Boolean operators. (Block 310). One or more of the element codes may optionally be given confidence levels (Block 320), the database is searched using the search statement (Block 330), and the results are output to the user (Block 340) for review. The final results may then be generated in sorted order based, for example, on the assigned confidence values (Block 350), or the search statement maybe modified for second or subsequent searches. While this embodiment may in some instances be less convenient than the foregoing embodiments, it may prove to be faster for experienced users. The remaining steps of this method are similar to those performed in the second embodiment.

Figure 19:
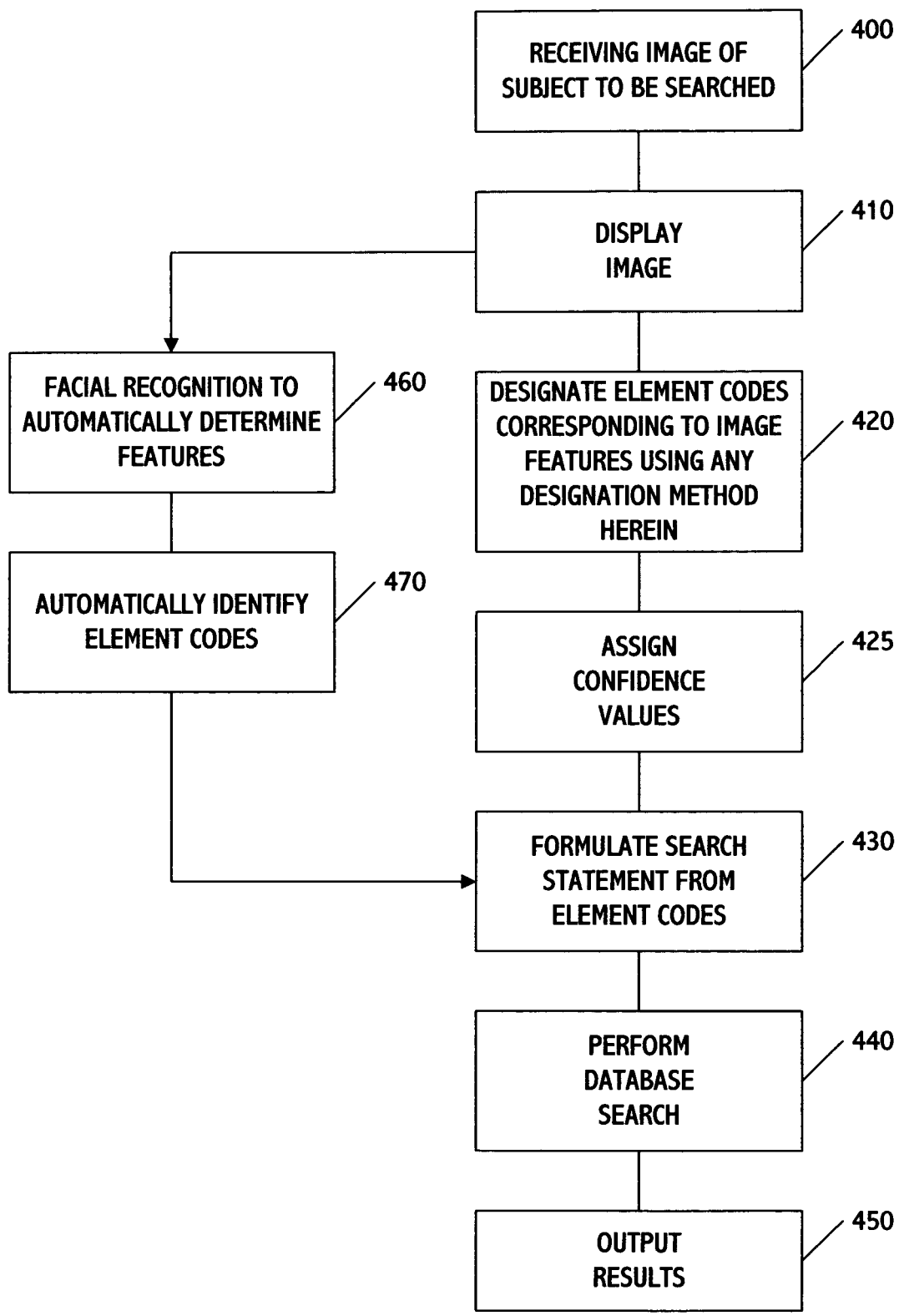
FIG. 19 is a flow chart showing steps included in a method of searching for image data in accordance with another embodiment of the present invention.

FIG. 19 is a flow chart showing steps included in a fourth embodiment of the method of the present invention. An initial step of this method includes receiving an image of a subject to be searched. (Block 400). The image may be received from the image acquisition unit, downloaded through a network, or obtained in any other way known. Once received, the image may be displayed in a window of the display to allow a user to view and determine one or more facial features of the subject. (Block 410). The user may then designate element codes corresponding to those features using any method described herein (Block 420). This results in the formation of a search statement (Block 430). A database search is then performed for relevant facial codes based on the search statement. (Block 440). The results of the search are then output for review, preferably in sorted order based on confidence levels assigned (Block 425) or the search statement may be modified to perform second and subsequent searches. (Block 450).

Optionally, a facial recognition program maybe implemented as a way of automatically determining those facial features. (Block 460). This program may analyze the received image to determine, for example, the type of eyes (e.g., round, almond-shaped, etc.) the subject has. Once determined, the processing unit may automatically determine the element code corresponding to that eye-type based on the information output from the facial recognition program. (Block 470). This may be performed by accessing the table shown in FIG. 15. For confirmation purposes, the digital image corresponding to the element code is displayed in the main window of the display screen. Element codes corresponding to other facial features recognized by the program may also be identified. Features which cannot be recognized maybe ignored.

When all the recognizable features have been determined, a compound search statement of element codes is generated. (Block 430). As in previous embodiments, the user may have an opportunity to modify the relationship between the element codes, e.g., by inserting or changing default Boolean operators. When the search statement is in a form acceptable to the user, the database is searched. The results may then be reviewed, assigned a confidence value, and/or narrowed in a manner similar to the previous embodiments, until a final set of facial codes determined to be most relevant is located.

The foregoing embodiments may be modified in a number of ways.

First, the element-code designating step maybe modified to allow the user designate not only the pictorial entity symbol but also one or more image qualifiers associated with that symbol. This maybe accomplished through the features of the composite image-generating program. As showing in FIG. 14, this program generates a functional indicator 501 in a toolbar 502 which may be used to adjust the size or position of a pictorial entity symbol (i.e., facial feature variation) shown in the main window. Sliding the indicator in one direction may, for example, increase the distance between the eyes, and sliding it in the other direction will decrease this distance. As adjustments are made, the element code corresponding to the facial feature will automatically change to reflect the adjustments. A database search may then be performed which includes the changed element codes.

Second, the processor used to perform the search of the present invention may be changed depending on the location of the database. If the database is local, the processing unit shown in FIG. 1 or 2 maybe used to perform the search. If, however, the database is remotely located from the system (e.g., connected to the system through a network), the search maybe performed by a remote processor. In this case, the processing unit may send the search statement formulated by the user to a remote processor, which would then perform the search. Searching using one or more spatial indexes may also be performed.

If desired, in any of the foregoing embodiments an additional step of allowing a user to provide confidence level information to the results of any iteration in the search for facial codes maybe performed. For example, after searching and generating a first set of facial codes and reviewing the corresponding images, a user may assign a confidence level to one or more of the images. The confidence level may, for example, be expressed as a value within a predetermined range, a percentage, or any other type of information. The results of the search may then be output in sorted order based on the assigned confidence levels. For subsequent searches, new or modified confidence levels may be assigned to the composite images corresponding to the first set of facial codes and/or to composite images corresponding to second or subsequent sets of facial codes generated in accordance with the present invention. Final results may then be output in sorted order based on the last-assigned confidence levels. Thus, in accordance with any one or more of the embodiments of the present invention, confidence levels maybe assigned to selected facial features during formulation of a search statement and/or to the results of a search generated using the search statement. The results may then be sorted to provide a more meaningful or convenient output to the user.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

I claim:

1. A method comprising:
    searching a plurality of facial codes based on information designating at least one facial feature, each facial code defining a digital representation of a face; and
    outputting results of the search, wherein each facial code includes element codes defining a respective plurality of features included in the digital representation of a face, and wherein the plurality of facial codes are searched to locate at least one facial code that includes an element code corresponding to said at least one designated facial feature.

2. The method of claim 1, wherein outputting results of the search includes:
    outputting a first set of facial codes including an element code corresponding to said at least one designated facial feature.

3. The method of claim 2, wherein said outputting includes:
    displaying one or more composite images corresponding to respective ones of the first set of facial codes produced from the search.

4. The method of claim 2, further comprising:
    searching the first set of facial codes to locate a second set of facial codes including an element code corresponding to another designated facial feature.

5. The method of claim 4, further comprising:
    displaying one or more composite images corresponding to respective ones of the second set of facial codes.

6. The method of claim 1, wherein the information designating said at least one facial feature is included in a user-initiated signal which includes element codes related by one or more Boolean operators, said at least one facial code located by the search including the elements codes related in a manner defined by the Boolean operators.

7. The method of claim 1, further comprising:
acquiring an image of a subject; and
receiving the information designating said at least one facial feature from a user, said at least one facial feature belonging to the subject in the image.

8. The method of claim 7, further comprising:
outputting the image of the subject on a display to enable a user to identify said at least one facial feature.

9. The method of claim 1, further comprising:
acquiring an image of a subject having said at least one facial feature;
using a facial recognition algorithm to designate said at least one facial feature; and
determining one or more element codes corresponding to said at least one designated facial feature, wherein the facial codes are searched to locate at least one facial code that includes the one or more determined element codes.

10. The method of claim 1, wherein the facial codes are searched to locate a set of facial codes each including the element code corresponding to said at least one designated facial feature, said method further comprising displaying composite images corresponding to the facial codes in said set.

11. The method of claim 2, further comprising:
forming a composite image based on digital images files corresponding to the element codes included in the facial code produced from the search; and
displaying the composite image.

12. A system, comprising:
a processor which searches a plurality of facial codes based on information designating at least one facial feature, each facial code defining a digital representation of a face; and
a screen which outputs results of the search, wherein each facial code includes element codes defining a respective plurality of features included in the digital representation of a face, and wherein the processor searches the plurality of facial codes to locate at least one facial code that includes an element code corresponding to said at least one designated facial feature.

13. The system of claim 12, wherein the processor generates a first set of facial codes each including an element code corresponding to said at least one designated facial feature.

14. The system of claim 13, wherein the screen displays one or more composite images corresponding to respective ones of the first set of facial codes produced from the search.

15. The system of claim 13, wherein the processor searches the first set of facial codes to locate a second set of facial codes which include an element code corresponding to another designated facial feature.

16. The system of claim 15, wherein the screen displays one or more composite images corresponding to respective ones of the second set of facial codes.

17. The system of claim 13, wherein the information designating said at least one facial feature is included in a user-initiated signal which includes element codes related by one or more Boolean operators, said at least one facial code located by the processor search including the elements codes related in a manner defined by the Boolean operators.

18. The system of claim 12, further comprising:
an image acquisition unit which acquires an image of a subject having said at least one facial feature.

19. The system of claim 18, wherein the screen displays the image acquired by the image acquisition unit.

20. The system of claim 12, further comprising:
an image acquisition unit which acquires an image of a subject having said at least one facial feature; and
a medium storing a facial recognition algorithm which designates said at least one facial feature, wherein the processor determines one or more element codes corresponding to said at least one designated facial feature and searches the facial codes to locate at least one facial code that includes the one or more determined element codes.

21. The system of claim 12, wherein the processor searches the facial codes to locate a set of facial codes each including said at least one designated element code, and wherein the screen displays composite images corresponding to the facial codes in said set.

22. A method for locating composite images, comprising:
generating a search statement designating at least one facial feature;
searching a plurality of facial codes based on the search statement, each facial code defining a digital representation of a face; and
outputting results of the search, wherein each facial code includes element codes defining a respective plurality of features included in the digital representation of a face, and wherein the plurality of facial codes are searched to locate at least one facial code that includes an element code corresponding to said at least one designated facial feature.

23. The method of claim 22, wherein generating the search statement includes:
selecting one of a plurality of displayed digital images corresponding to a first type of facial feature, said at least one designated facial feature corresponding to the selected digital image.

24. The method of claim 26, further comprising:
identifying the element code corresponding to said at least one designated facial feature.

25. The method 22, further comprising:
receiving confidence information indicating how close the selected digital image matches a subject of the search.

26. The method of claim 22, wherein outputting results of the search includes:
outputting a first set of facial codes including an element code corresponding to said at least one designated facial feature.

27. The method of claim 26, wherein said outputting includes:
displaying one or more composite images corresponding to respective ones of the first set of facial codes produced from the search.

28. The method of claim 26, further comprising:
searching the first set of facial codes to locate a second set of facial codes including an element code corresponding to another designated facial feature.

29. The method of claim 28, further comprising:
displaying one or more composite images corresponding to respective ones of the second set of facial codes.

30. The method of claim 22, wherein the information designating said at least one facial feature is included in a user-initiated signal which includes element codes related by one or more Boolean operators, said at least one facial code located by the search including the elements codes related in a manner defined by the Boolean operators.

31. The method of claim 22, further comprising:
acquiring an image of a subject,
wherein the search statement is generated by receiving information designating said at least one facial feature from a user, said at least one facial feature belonging to the subject in the image.

32. The method of claim 31, further comprising:
outputting the image of the subject on a display to enable a user to identify said at least one facial feature.

33. The method of claim 22, wherein generating the search statement includes:
acquiring an image of a subject having said at least one facial feature;
using a facial recognition algorithm to designate said at least one facial feature; and
determining one or more element codes corresponding to said at least one designated facial feature, wherein the facial codes are searched to locate at least one facial code that includes the one or more determined element codes.

34. The method of claim 22, wherein the facial codes are searched to locate a set of facial codes each including the element code corresponding to said at least one designated facial feature, said method further comprising displaying composite images corresponding to the facial codes in said set.

35. The method of claim 22, further comprising:
forming a composite image based on digital images files corresponding to the element codes included in the facial code produced from the search; and
displaying the composite image.

* * * * *